United States Patent
Castaneda et al.

(10) Patent No.: US 11,386,613 B2
(45) Date of Patent: *Jul. 12, 2022

(54) METHODS AND SYSTEMS FOR USING DYNAMIC LIGHTMAPS TO PRESENT 3D GRAPHICS

(71) Applicant: Verizon Patent and Licensing Inc., Basking Ridge, NJ (US)

(72) Inventors: Oliver S. Castaneda, West Henrietta, NY (US); William Robert Davey, Somerville, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/329,419

(22) Filed: May 25, 2021

(65) Prior Publication Data
US 2021/0279947 A1 Sep. 9, 2021

Related U.S. Application Data

(63) Continuation of application No. 16/528,522, filed on Jul. 31, 2019, now Pat. No. 11,049,315.

(51) Int. Cl.
*G06T 15/50* (2011.01)
*G06T 15/04* (2011.01)
(Continued)

(52) U.S. Cl.
CPC ............ *G06T 15/506* (2013.01); *G06T 15/04* (2013.01); *G06T 15/06* (2013.01); *G06T 15/20* (2013.01);
(Continued)

(58) Field of Classification Search
None
See application file for complete search history.

(56) References Cited

U.S. PATENT DOCUMENTS 11,170,577 B2 * 11/2021 Seiler .................... G06T 19/006
11,238,572 B2 * 2/2022 Pouli ...................... H04N 19/85
(Continued)

FOREIGN PATENT DOCUMENTS

EP 3217361 A1 * 9/2017 ............. G06T 15/00

OTHER PUBLICATIONS

Stefan Roettger, Ingo Frick, "The Terrain Rendering Pipeline," 2002, Proceedings of East-West Vision pp. 195-199 (Year: 2002).*
(Continued)

*Primary Examiner* — Michael J Cobb

(57) ABSTRACT

Illustrative methods and systems described herein use lightmaps to present 3D graphics. For example, a method includes identifying a viewpoint within a 3D scene and receiving a dynamic lightmap for an object represented by a 3D model in the 3D scene. The identified viewpoint is selected by a user of a media player device presenting the 3D scene to the user and the dynamic lightmap is generated or updated at a first level of detail determined based on the identified viewpoint. The method further includes rendering an image for presentation to the user from the identified viewpoint. This rendering of the image includes rendering the 3D model at a second level of detail that is lower than the first level of detail, and applying the dynamic lightmap at the first level of detail to the 3D model rendered at the second level of detail. Corresponding systems are also disclosed.

20 Claims, 13 Drawing Sheets

(51) Int. Cl.
*G06T 15/06* (2011.01)
*G06T 15/20* (2011.01)
*G06T 19/00* (2011.01)
*H04L 65/61* (2022.01)

(52) U.S. Cl.
CPC ............ *G06T 15/50* (2013.01); *G06T 19/006* (2013.01); *G06T 2215/12* (2013.01); *H04L 65/4069* (2013.01)

(56) References Cited

U.S. PATENT DOCUMENTS

| | | |
|---|---|---|
| 2005/0248571 A1 | 11/2005 | McTaggart |
| 2010/0091018 A1 | 4/2010 | Tatarchuk et al. |
| 2013/0038618 A1 | 2/2013 | Urbach |
| 2015/0262407 A1* | 9/2015 | Fursund .................. G06T 15/80 345/426 |
| 2015/0301592 A1 | 10/2015 | Miller |
| 2016/0155261 A1* | 6/2016 | Iborra .................... G06T 15/04 345/426 |
| 2016/0350967 A1 | 12/2016 | Klassen |
| 2017/0032500 A1 | 2/2017 | Csefalvay |
| 2017/0263043 A1 | 9/2017 | Peterson et al. |
| 2018/0211440 A1 | 7/2018 | Kunkel et al. |
| 2018/0295317 A1 | 10/2018 | Tyagi et al. |
| 2019/0362540 A1 | 11/2019 | Chen et al. |

OTHER PUBLICATIONS

Jasper Flick, "Rendering 18: Realtime GI, Probe Volumes, LOD Groups," 2017, retrieved from "https://catlikecoding.com/unity/tutorials/rendering/part-18/" (Year: 2017).*

Android Developers, "Lighting for Mobile Games with Unity," 2021, retrieved from "https://developer.android.com/games/optimize/lighting-for-mobile-games-with-unity" (Year: 2021).*

Unigine Dev, "Lightmapping," 2022, retrieved from "https://developer.unigine.com/en/docs/latest/editor2/lighting/gi/lightmaps" (Year: 2022).*

Crassin, et al., "Cloudlight: A system for amortizing indirect lighting in real-time rendering", NVIDIA Technical Report NVR-2013-001, Jul. 2013.

* cited by examiner

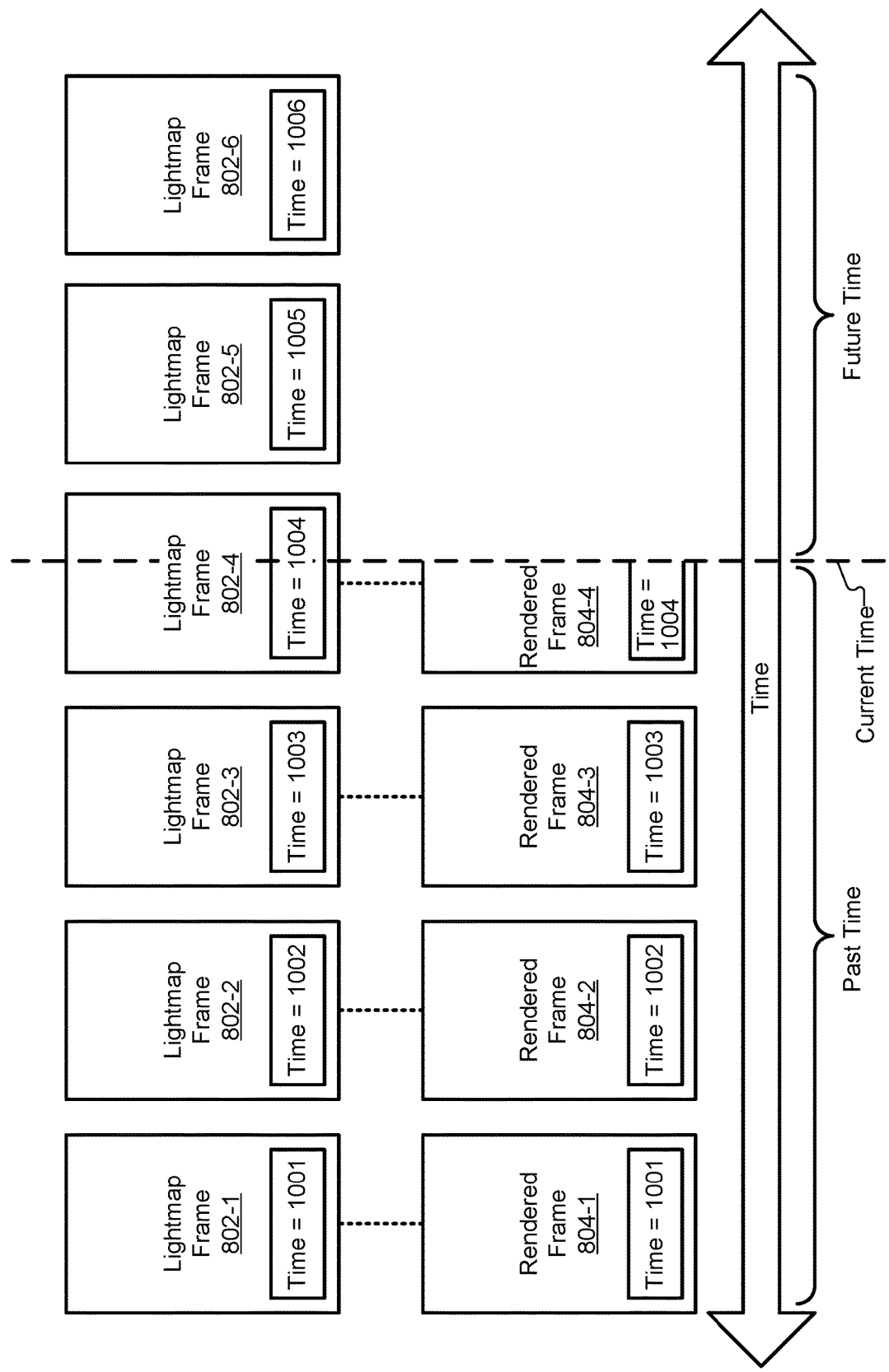

METHODS AND SYSTEMS FOR USING DYNAMIC LIGHTMAPS TO PRESENT 3D GRAPHICS

RELATED APPLICATIONS

This application is a continuation application of U.S. patent application Ser. No. 16/528,522, entitled "Methods and Devices for Bifurcating Graphics Rendering Between a Media Player Device and a Multi-Access Edge Compute Server" and filed Jul. 31, 2019, which is hereby incorporated by reference in its entirety.

BACKGROUND INFORMATION

In a variety of entertainment, educational, and other types of applications, three-dimensional ("3D") graphics are rendered to allow users to experience 3D scenes. For example, 3D scenes may be associated with video gaming applications, extended reality applications (e.g., virtual reality applications, augmented reality applications, etc.), 3D animation applications, immersive communication applications, and/or any of various other types of applications in which simulated 3D worlds are presented to users.

In many of these types of applications, a particular 3D scene may be presented to a user by a media player device used by the user. Typically, such media player devices are consumer devices such as mobile devices (e.g., smartphones, tablet devices, headsets, etc.), television devices, personal computer devices, or the like. In general, it is not practical or possible for such media player devices to host sufficient computing power to perform highly intensive graphics processing in the real time or near real time environment of certain applications. This is because various factors that must be considered in implementing systems to perform such processing (e.g., hardware capabilities, power consumption, battery life, cooling, cost efficiency, etc.) are currently only suitably addressed by larger, more powerful systems. As a result, media player devices are generally not configured to perform certain processing-intensive rendering techniques, and the immersiveness and accuracy of the 3D scenes rendered by a consumer media player device may be compromised as a result.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8 illustrates an exemplary lightmap frame sequence with a corresponding rendered frame sequence along a timeline according to principles described herein.

DETAILED DESCRIPTION OF PREFERRED EMBODIMENTS

Figure 1:
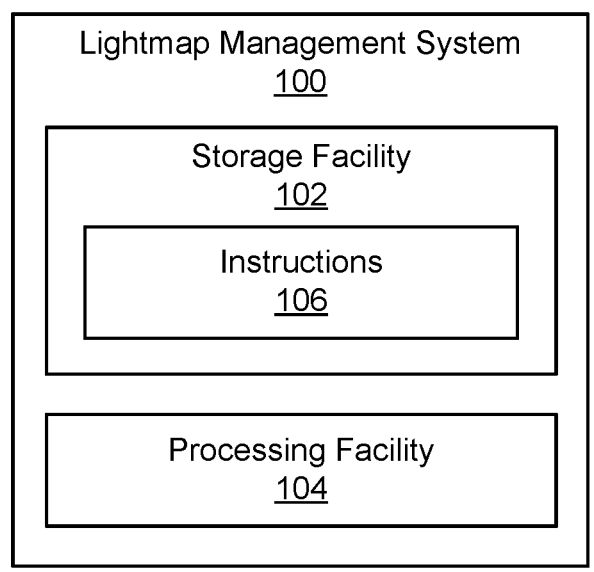
FIG. 1 illustrates an exemplary lightmap management system for bifurcating graphics rendering between a media player device and a multi-access edge compute ("MEC") server according to principles described herein.

Methods and devices for bifurcating graphics rendering between a media player device and a multi-access edge compute ("MEC") server are described herein. One particular challenge associated with graphics rendering relates to simulating the complex interplay of light from multiple light sources (e.g., including direct or primary light sources that produce light, and indirect or secondary light sources that reflect light produced by direct light sources or reflected from other indirect light sources) as the light illuminates surface points of objects in a three-dimensional ("3D") scene. One technique for performing this type of simulation that produces extremely accurate, realistic, and immersive renderings is the technique of raytracing, in which individual virtual light rays are simulated to propagate through a 3D scene to determine how real light rays would propagate and illuminate various object surfaces. Unfortunately, raytracing is a computationally-intensive task that is typically not possible or practical for media player devices to perform locally, and configurations in which graphics are rendered locally therefore typically utilize rendering techniques that produce inferior graphics to those produced using raytracing techniques. Moreover, other challenges arise when graphics rendering is performed exclusively on a distant server (e.g., a cloud server or the like) and fully rendered graphics are delivered to the media player device to be displayed. In these cases, raytraced graphics may be generated and displayed, but delay, connectivity issues and/or bandwidth limitations between the server and the media player device (e.g., latency issues, network interruptions, bandwidth usage, etc.) result in inefficient resource usage, issues in which rendered images glitch, failures to respond timely to user input, delays, and so forth.

Methods and systems used herein may bifurcate graphics rendering between the media player device and a multi-access edge compute ("MEC") server in a manner that addresses (e.g., solves) one or more of these issues. As will be described in more detail below, certain aspects of graphics rendering may be handled by MEC servers that are communicatively coupled to the media player device with a relatively low latency (e.g., achieved by being located physically proximate to the media player device and/or by having powerful parallel computing resources available to perform computing tasks on demand). MEC servers may provide lower latency for performing graphics rendering tasks than other types of distributed computing servers (e.g., cloud servers, etc.) that may be many miles away (e.g., dozens or hundreds of miles away) and/or may have less powerful or fewer parallel computing resources available so as to be associated with relatively high latency when communicating with the media player device. Meanwhile, other aspects of the graphics rendering (e.g., aspects that are important for continuity in the user's experience to avoid glitching and so forth) may be handled by the media player device locally. In this way, high quality images that fully utilize raytracing techniques to render light in a highly realistic manner can be presented on media player devices without latency or other issues even when a communication link between the media player device and the server experiences issues or temporarily fails. At the same time, the processing load required by the media player device may be kept relatively low, improving battery life, performance of applications executing on the media player device, and so forth.

To this end, and as will be described in more detail below, an exemplary lightmap management system implemented by a MEC server may be configured to perform various operations to implement the bifurcating of graphics rendering described herein. For example, the lightmap management system may access graphics data representative of a 3D model of an object that is located within a 3D scene and that includes a surface point at a first location within the 3D scene (along with various other surface points at other locations). The lightmap management system may also identify a second location (within the 3D scene) from which a light source (e.g., a direct or an indirect light source) illuminates the object within the 3D scene. Based on raytracing of virtual light rays from the second location to the first location, the lightmap management system may generate and/or update a dynamic lightmap for the object represented by the 3D model. For example, the computationally-intensive raytracing techniques described above may be performed by the MEC server hosting the lightmap management system in any suitable way to generate the dynamic lightmap to be associated with a particular scene geometry in which the surface point of the object is at the first location and is illuminated by the light source from the second location.

In response to the generating and/or updating of the dynamic lightmap, the lightmap management system may provide the dynamic lightmap to a media player device communicatively coupled to the MEC server and configured to apply the dynamic lightmap to the 3D model. For example, the media player device may be configured to present the 3D scene to a user of the media player device from a viewpoint selected by the user. The presenting of the 3D scene by the media player device may include rendering an image that depicts the particular scene geometry from the selected viewpoint, and the applying of the dynamic lightmap to the 3D model may be performed as part of this rendering of the image. In accordance with these operations, a single frame is rendered. However, it will be understood that this process may be repeated in rapid succession to deliver frame-by-frame dynamic lightmaps that each include any number of objects with any number of surfaces and surface points accounted for by way of raytracing techniques by the MEC server. Such lightmaps may be utilized to continuously render a highly-accurate, high-quality video image depicting the 3D scene and objects included therein from the user-selected viewpoint as the viewpoint and/or the objects in the scene (and surfaces thereof) dynamically change and move. It will be understood that the operations described above may be performed in any suitable sequence and/or may be performed concurrently or in parallel with one another as may serve a particular implementation.

Methods and devices described herein for bifurcating graphics rendering between a media player device and a MEC server may provide various benefits and advantages. For example, as mentioned above, one exemplary benefit is that media player devices that would otherwise not be capable or well-suited to perform raytracing techniques that result in very high-caliber graphics are enabled by methods and systems described herein to present such high-quality graphics based on dynamic lightmaps that are rendered in a distributed manner (e.g., on a MEC server rather than locally on the media player device). However, because such dynamic lightmaps are not crucial to the rendering of the geometry of the image, but, rather, just improve the realism and quality projected onto that geometry, the risk is minimal that glitching or other undesirable artifacts will seriously distract or even be noticed by a user if a communication link between the media player device and the MEC server should temporarily falter. Even in the event that a user does notice a decline in realism or quality of simulated lighting when network communications are temporarily interrupted, the decoupling of the light rendering and geometry rendering described herein allows the media player device to continue rendering the geometry of the scene at a steady framerate from the point of view of the user, thereby avoiding frame stuttering, dropped frames, and other artifacts that might otherwise interfere with fast-paced gameplay, cause the user to experience extended reality motion sickness, or result in other undesirable consequences. Moreover, due to the low latency associated with distributed computing performed by way of MEC technologies (e.g., as opposed to other distributed computing technologies such as cloud computing technologies), the system responsiveness provided by the media player device may be indistinguishable to the user from an implementation performed entirely locally on the media player device.

As will be further described below, another benefit of methods and systems described herein relates to lightmaps being used as irradiance caches to improve image quality without increasing raytracing processing to track multiple reflections for each virtual light ray. Additionally, yet another exemplary benefit that will be described in more detail below is that images rendered at a relatively low level of detail by a media player device (e.g., rendered using relatively few surface polygons or other mesh building techniques) may be made to look more realistic by utilizing dynamic lightmaps rendered by the MEC server at a relatively high level of detail (e.g., rendered using a relatively large number of surface polygons). Each of these and other benefits described herein may significantly improve the quality of graphics and the overall user experience without significantly increasing the processing required of media player devices (e.g., thereby helping with battery life, not requiring device upgrades, etc.).

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary lightmap management system 100 ("system 100") for bifurcating graphics rendering between a media player device and a MEC server. For example, as will be described in more detail below, lightmap management system 100 may be implemented on a MEC server that is communicatively coupled with a media player device and may be configured to enable or facilitate the bifurcating of the graphics rendering between the media player device and the MEC server.

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices (e.g., multiple computers at a single MEC node, etc.) and/or multiple locations as may serve a particular implementation. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with bifurcating graphics rendering between a media player device and a MEC server. To this end, processing facility 104 may be configured to access graphics data representative of a 3D model of an object located within a 3D scene and including, among various surface points of various surface of the object, a surface point located at a first location within the 3D scene. Processing facility 104 may be further configured to identify a second location from which a light source illuminates the object within the 3D scene. For example, the second location may also be within the 3D scene (e.g., at a different location than the first location) and may be a point associated with a direct light source that is producing light (e.g., a point on a primary light source such as the sun in an outdoor 3D scene, a light fixture in an indoor 3D scene, etc.) or a point associated with an indirect light source that is reflecting light (e.g., a point in the sky on a cloudy day in which the primary light source of the sun is blocked, a point on a secondary light source such as a wall or other object surface that reflects light originating from a primary light source or reflecting from another surface to propagate to a surface of the object at the first location). It will be understood that the first and second locations of the surface point and the light source, respectively, may be apparent locations relative to a viewpoint of the user rather than, or in addition to, actual locations. For instance, if the sun is present as a primary light source in an image presented to a user, the identified second location may represent coordinates, within the image, of where the sun appears, rather than an actual location in world space that is millions of miles from the Earth.

Because system 100 is implemented on powerful distributed computing resources (e.g., resources of a MEC server) rather than on the more modest computing resources local to a media player device, processing facility 104 may be fully capable of performing computationally-intensive raytracing techniques to simulate virtual light rays propagating around the 3D scene. Accordingly, based on raytracing of virtual light rays from the second location to the first location, processing facility 104 may generate or update a dynamic lightmap for the object represented by the 3D model. This dynamic lightmap may correspond to a single frame or a single moment in time when the object and the scene are situated in one particular configuration. More particularly, the dynamic lightmap may be associated with a particular scene geometry in which the surface point of the object is at the first location and is illuminated by the light source from the second location.

In response to the generating and/or updating of the dynamic lightmap, processing facility 104 may provide the dynamic lightmap to a media player device (not explicitly shown in FIG. 1) that is communicatively coupled to the MEC server implementing system 100. For example, the media player device may be configured to present the 3D scene to a user of the media player device from a viewpoint selected by the user. To present the 3D scene in this way, the media player device may render an image that depicts the particular scene geometry from the selected viewpoint. In order to render a high-quality image, this rendering may include applying the dynamic lightmap provided by system 100 to the 3D model as the object is rendered in the image.

In some examples, system 100 may be configured to operate in real time so as to provide, receive, process, and/or use the data described above (e.g., graphics data, dynamic lightmaps, 3D models, etc.) immediately as the data is generated, updated, changed, or otherwise becomes available. As a result, system 100 may bifurcate graphics rendering between a media player device and a MEC server based on relevant, real-time data so as to allow the graphics rendering to happen responsively to user decisions that would affect the user's viewpoint of the 3D scene, that would affect objects within the scene, and so forth. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may perform bifurcated graphics rendering based on data that is relevant and up-to-date.

The methods described herein for bifurcating graphics rendering between a media player device and a MEC server may be performed, implemented, or used by implementations of system 100 configured for use in a variety of different types of use cases. To provide just a few non-limiting examples, implementations of system 100 may be deployed on a 5G, real-time enterprise ("RTE") network (or any other suitable provider network in which MEC technology is deployed) to enable extended reality applications (e.g., augmented or virtual reality applications, etc.), gaming applications (e.g., 3D games in which users perform tasks alone or by interacting with other users playing the game simultaneously), or any other applications in which it is desirable to render high-quality and/or low-latency graphics.

Figure 2:
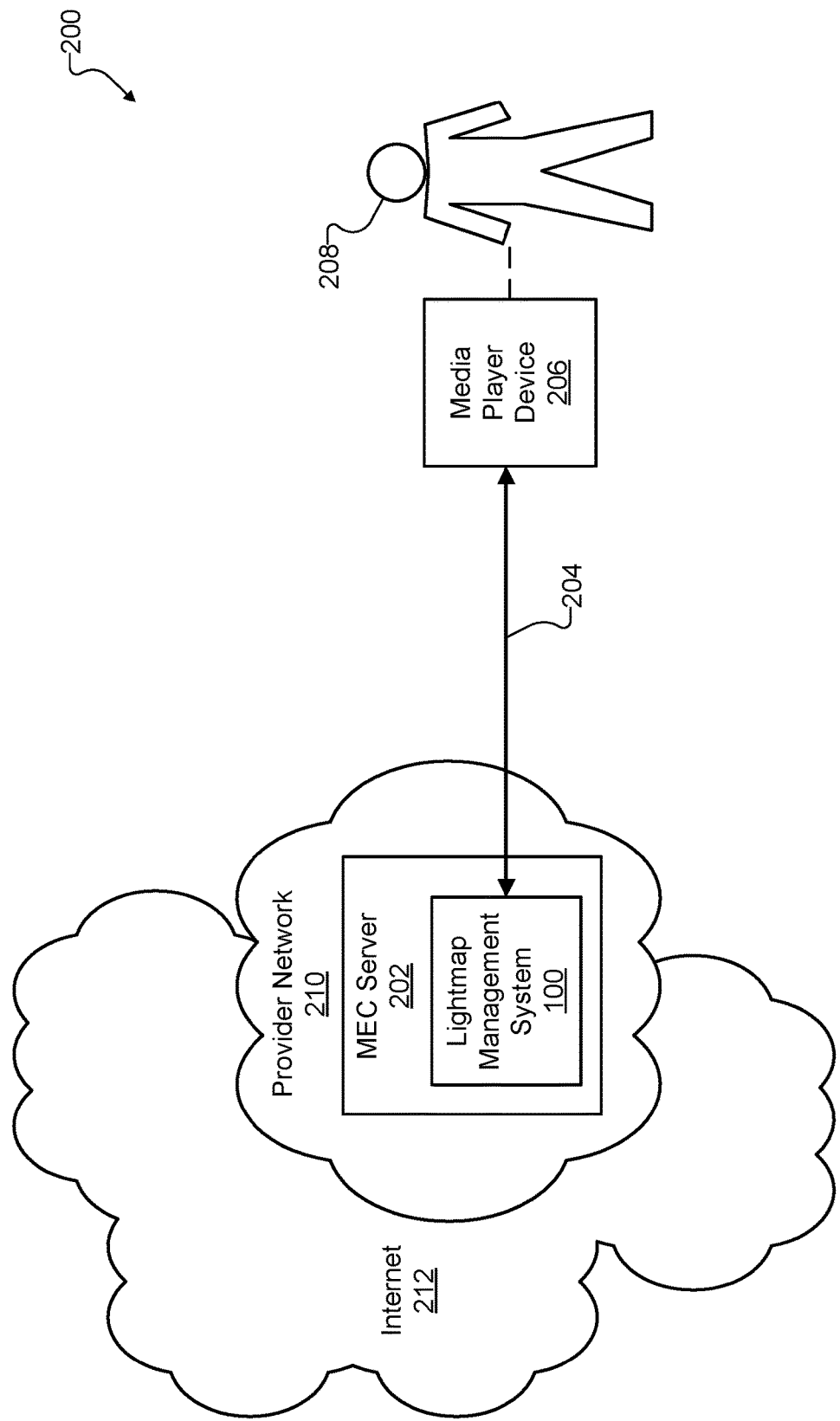
FIG. 2 illustrates an exemplary configuration within which the lightmap management system of FIG. 1 may operate according to principles described herein.

FIG. 2 illustrates an exemplary configuration 200 within which system 100 may operate to bifurcate graphics rendering between a media player device and a MEC server in accordance with methods and systems described herein. Specifically, as shown in configuration 200, system 100 is implemented by a MEC server 202 that is communicatively coupled, by way of a communication link 204 with a media player device 206 used by a user 208. MEC server 202 resides on or is a part of a provider network 210 that also provides access to other networks such as the Internet (Internet 212). System 100 was described above in relation to FIG. 1. Each of the other components shown in FIG. 2 will now be described in more detail.

Media player device 206 may be implemented as (or may be included within) any suitable computing system or device as may be employed for performing any of the use cases or applications described herein. To this end, media player device 206 may include one or more display screens (e.g., traditional display screens, partially transparent heads-up display ("HUD") screens, computer monitors, etc.) configured to display rendered graphics presented by media player device 206. Media player device 206 may be implemented as a mobile device (e.g., a smartphone, a tablet computing device, etc.), a virtual or augmented reality device (e.g., a head-mounted device configured to display graphics directly in front of each eye of user 208), a portable or stationary computing device (e.g., a personal desktop or laptop computer, etc.), a television device, or any other system or device as may serve a particular implementation.

User 208 may be anyone viewing graphics presented by media player device 206 and will be understood to have some degree of control over what graphics media player device 206 presents. For example, user 208 may indicate a particular viewpoint within the 3D scene from which user 208 wishes to view the world by moving an avatar around within the 3D scene, turning to look in different directions, and so forth.

Provider network 210 may be implemented by a provider-specific wired or wireless communications network (e.g., a cellular network used for mobile phone and data communications, a 5G network or network of another suitable technology generation, a cable or satellite carrier network, a mobile telephone network, etc.), and may be operated and/or managed by a provider entity such as a mobile network operator (e.g., a wireless service provider, a wireless carrier, a cellular company, etc.). The provider of provider network 210 may own or control all of the elements necessary to sell and deliver communications services to user 208, including radio spectrum allocation, wireless network infrastructure, back haul infrastructure, customer care, provisioning of devices, network repair for provider network 210, and so forth.

In contrast, Internet 212 may include any interconnected network infrastructure that is outside of provider network 210 and outside of the control of the provider. For example, Internet 212 may include the Internet, a wide area network, a content delivery network, and/or any other suitable network or networks managed by any third parties outside of the control of the provider of provider network 210.

Both of provider network 210 and Internet 212 will be understood to provide data delivery between server-side provider systems and client-side systems and devices such as media player device 206. To this end, provider network 210 and Internet 212 may implement or employ any suitable communication technologies, devices, media, protocols, or the like as may serve a particular implementation.

MEC server 202 may represent one or more computing systems (e.g., server computers), devices, nodes, or other collections of computing resources that are integrated within a provider network such as provider network 210 and configured for use by multiple users of the provider network. For example, MEC server 202 may be integrated within one or more radio access network ("RAN") resources, core network resources, service access point ("SAP") resources, or other suitable resources of provider network 210. As shown, MEC server 202 may be integrated within provider network 210 (e.g., deployed on provider network 210 as an edge node on the network so as to communicate with devices and systems connected to provider network 210 with low latency). For example, if provider network 210 includes or is implemented by 5G network technology, MEC server 202 may include or be implemented as a 5G node in a fixed 5G deployment, a mobile 5G deployment (e.g., a network on wheels), or another suitable deployment.

Because MEC server 202 is integrated within (e.g., implemented as part of) provider network 210, it will be understood that MEC server 202 is separate from client systems served by MEC server 202 such as media player device 206. Additionally, because a MEC server may include shared resources that can be leveraged by multiple client systems (e.g., multiple media player devices, etc.), it may be efficient and economical for MEC server 202 to employ a considerable wealth of computing power (e.g., significantly more computing power and resources than may be practical to include within media player device 206). For instance, MEC server 202 may include a plurality of parallel processors (e.g., central processing units ("CPUs"), graphics processing units ("GPUs"), etc.) for efficiently performing various processing-intensive operations (e.g., graphics rendering operations, raytracing operations, etc.) that may be performed by system 100, as described above.

Moreover, because MEC server 202 is deployed on provider network 210, there may be a very low transport latency associated with exchanging data between MEC server 202 and media player device 206, thereby allowing MEC server 202 to perform tasks for media player device 206 with high responsiveness that will appear to user 208 to be instantaneous (e.g., as if the tasks are being performed locally on media player device 206). In some examples, the latency associated with operations performed by MEC server 202 may be unperceivable by user 208, thereby enabling and bolstering the real-time nature of system 100 described above.

MEC server 202 may also be differentiated from computing resources deployed outside of provider network 210. For example, cloud servers (not explicitly shown in FIG. 2) may be available for processing client data such as data for media player device 206, but these cloud servers may be operated by third parties other than the provider of provider network 210. As such, communication with such cloud servers may be performed only by way of provider network 210 and Internet 212, rather than just by way of provider network 210, potentially adding significant latency as compared to the latency achieved with communications to MEC server 202 directly by way of provider network 210. Accordingly, while system 100 may be implemented by such cloud servers in certain implementations, it will be understood that the benefits described herein of real-time and ultra-low-latency graphics rendering (e.g., graphics rendering with latency that is unperceivable by users) are generally only possible when system 100 is implemented at the edge of provider network 210 by MEC server 202, as shown in configuration 200.

As described above, system 100, integrated within MEC server 202, may be configured to generate dynamic, real-time lightmaps that are used by media player device 206 to render and present higher quality graphics than media player device 206 would be able to produce using its own computing resources. For example, the graphics processing performed on MEC server 202 may employ raytracing techniques to ensure that lighting effects created by dynamic motion of objects and light sources within a 3D scene are accurately accounted for. In this sense, system 100 may perform lightmap generation as a dynamic service for media player device 206, and, as will be described in more detail below, may stream the resulting lightmaps to media player device 206 as a video texture or the like. However, while the lightmap generation is performed on MEC server 202 by system 100, it will be understood that the rendering described herein is bifurcated between MEC server 202 and media player device 206 such that certain other aspects of the rendering (e.g., certain aspects other than the lightmap generation) are performed by media player device 206 rather than outsourced to distributed resources such as MEC server 202.

To illustrate the interoperation of an exemplary implementation of system 100 with an exemplary implementation of media player device 206 to bifurcate graphics rendering in accordance with methods and systems described herein, a specific and extended example will now be provided in connection with FIGS. 3-8.

Figure 3:
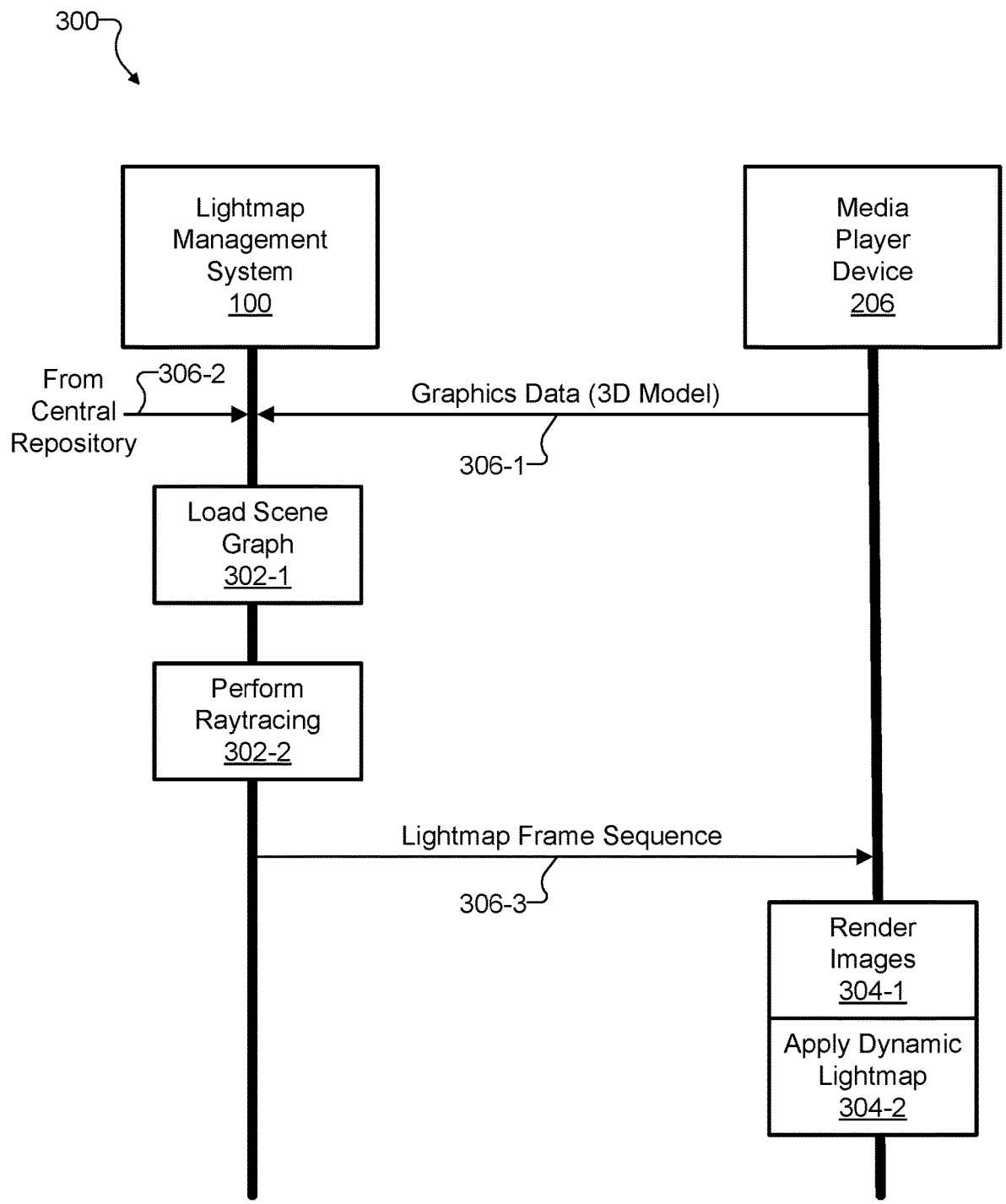
FIG. 3 illustrates an exemplary performance of operations and communications between the lightmap management system of FIG. 1 and the media player device of FIG. 2 to bifurcate graphics rendering according to principles described herein.

FIG. 3 illustrates an exemplary performance 300 of various operations and communications between system 100 and media player device 206 to bifurcate graphics rendering between media player device 206 and a MEC server implementing system 100. Specifically, as time moves forward from the top of FIG. 3 to the bottom of FIG. 3, performance 300 shows certain operations 302 (e.g., operations 302-1 and 302-2) that are performed by system 100 and other operations 304 (e.g., operations 304-1 and 304-2) that are performed by media player device 206. Additionally, in connection with operations 302 and/or 304, performance 300 shows certain communications 306 (e.g., communications 306-1 and 306-2) between system 100 and media player device 206 to enable and facilitate operations 302 and/or 304. In this way, performance 300 may progress until accurate, high-quality, raytraced graphics have been generated and are ready for presentation to user 208 of media player device 206. Each of operations 302, operations 304, and communications 306 will now be described in more detail.

Performance 300 begins when system 100 receives communication 306-1 ("Graphics Data (3D Model)"), which, as illustrated, may originate from media player device 206 and may include graphics data representative of a 3D scene and one or more 3D models of objects included within the 3D scene. The graphics data included in communication 306-1 may be represented and/or encoded in any format suitable for graphics data, state data, or the like. In certain examples, as an alternative or in addition to receiving graphics data from media player device 206 by way of communication 306-1, system 100 may receive similar graphics data by way of communication 306-2 from another suitable source ("From Central Repository"). For instance, as indicated, such graphics data may originate from a central repository such as a game server or extended reality server responsible for providing and/or coordinating media data (e.g., video game data, extended reality data, etc.) for a plurality of media player devices. In other examples, graphics data included within communication 306-2 may originate from other types of systems, from MEC server 202 (e.g., another part of the server distinct from the part implementing system 100), or from system 100 itself.

At operation 302-1 ("Load Scene Graph"), system 100 may be configured to load and initialize a scene graph describing where objects are placed within the 3D scene. The 3D scene may include various objects including objects that help form the 3D scene or boundaries thereof (e.g., a ground object, wall objects, a ceiling object, etc.), as well as other objects found in the scene (e.g., avatars of participants involved in a video game or extended reality experience; non-player characters controlled by the system; inanimate objects such as furniture, cars, trees, etc.; and so forth). Each object in the 3D scene may be associated with a mesh represented in the scene graph. While a mesh may be represented or implemented in any suitable manner, the mesh may generally be thought of as a wireframe representation of an object onto which texture and lighting information can be mapped during a rendering process.

To illustrate an example, a mesh of an object such as a basketball will be considered. The mesh may define the spherical shape and size and location of the basketball object within the 3D scene, but texture data (e.g., representing an orange, bumpy texture with a pattern of black lines cutting through it) and lighting data (e.g., indicating that the orange texture on the side facing lights in the room is to be rendered as a brighter orange than the orange texture on the side facing away from the lights) may need to be mapped onto various surfaces (each including various surface points) of the basketball mesh before the basketball object can be fully rendered as a 3D object viewed from the perspective of an arbitrary viewpoint (e.g., a viewpoint selected by a user).

Within the scene graph, each mesh of each object included within the 3D scene may be represented one or more times. For example, if there is one basketball object in the scene, a single basketball mesh may be included in the scene graph, while, if there are two basketball standards (i.e., backboards, rims, nets, etc.) in the scene, two instances of a basketball standard mesh may be included in the scene graph (corresponding to the two different locations within the 3D scene of the basketball standards).

As time proceeds during a presentation of the 3D scene, objects (including surface points thereof) and/or light sources within the 3D scene may move with respect to one another. For instance, to continue with the example of a basketball-related scene, players and the basketball may continuously move around within the 3D scene, requiring continuous updates to the scene graph. As used herein, a particular configuration of objects and light sources as they are positioned at a particular moment in time or for a certain duration of time is referred to as a "scene geometry." For example, in one exemplary scene geometry, players and the basketball may be on one side of the basketball court, while in another scene geometry, the players and the basketball may be on the other side of the basketball court, and so forth. The lighting information needed to accurately shade each surface point of each object in the scene may be different for each possible scene geometry. As such, for a dynamic 3D scene such as an action-packed basketball game, the scene geometry and corresponding lighting information may change from frame to frame.

In the example of a basketball game, the objects such as players and the ball may be more dynamic than the primary light sources (e.g., light fixtures mounted above the basketball court), which may stay relatively static at fixed locations within the 3D scene. In other examples, however, the light sources themselves may also move dynamically. For example, a castle courtyard scene associated with a medieval-themed video game is considered. If the courtyard is illuminated by torches carried by various players and/or non-player characters, the primary light sources themselves (i.e., the torches), as well as the other objects (e.g., the players, non-player characters, etc.) may all be in dynamic motion, thereby creating a very complex lighting scenario to be simulated.

Regardless of how simple or complex the lighting of a particular 3D scene may be, system 100 may address the challenge of generating and updating dynamic lightmaps to be mapped onto surface points of each object for each scene geometry (e.g., for each frame of a video sequence in cases where objects and light sources are dynamically moving) by producing and maintaining dynamic lightmaps that track each object for each scene geometry. For example, system 100 may generate a lightmap for an object and update that lightmap frame by frame as the object moves through the 3D scene with respect to direct and indirect light sources that illuminate it. It will be understood that individual lightmaps may be associated with each instance of any object in the scene, rather than with each 3D model or object type. For example, even if the same 3D model is used for multiple objects in the scene (e.g., multiple basketball standards in the example mentioned above), each instance of the object (e.g., each of the two basketball standards) may be associated with its own unique dynamic lightmap to account for lighting that may be present at its own unique location within the scene.

Dynamic lightmaps may be generated and updated in any manner as may serve a particular implementation. For example, as illustrated by operation 302-2 ("Perform Raytracing"), system 100 may generate and/or update dynamic lightmaps using raytracing technology that, as has been mentioned above, may be practical to perform on a server such as MEC server 202 while not being practical or possible to perform on media player device 206. To this end, system 100 may incorporate a raytracing kernel that operates over coordinates determined for the lightmap based on the scene graph loaded and defined at operation 302-1. For example, system 100 may use face indices (i.e., indices indicative of where triangles forming each mesh of each 3D model are located in the 3D scene), barycentric coordinates (e.g., coordinates into a barycentric coordinate system that is indicative of specific surface points on individual triangles indexed by the face indices), or any other indexing/coordinate scheme to retrieve world-space locations and normals for various texture element ("texels") that are to be associated with surface points represented in the dynamic lightmap. One advantage of indexing using face indices and barycentric coordinates in this way (as opposed, for example, to merely indexing directly into world space) is that the indexing may stay the same for an object even as the object moves through world space or transforms itself in various ways (e.g., if the object is not rigid but is capable of existing in different states).

For each particular surface point identified and indexed in this way, a lighting integral may be performed over a hemisphere incident on the surface point to determine the amount of light incident on the surface point from direct and indirect sources in the 3D scene. More particularly, system 100 may use raytracing techniques to determine an intensity of virtual light rays that reach the surface point from a variety of directions in order to determine how bright lighting data associated with the point should be in the dynamic lightmap, as well as to determine what color the light should be and so forth.

Figure 4A:
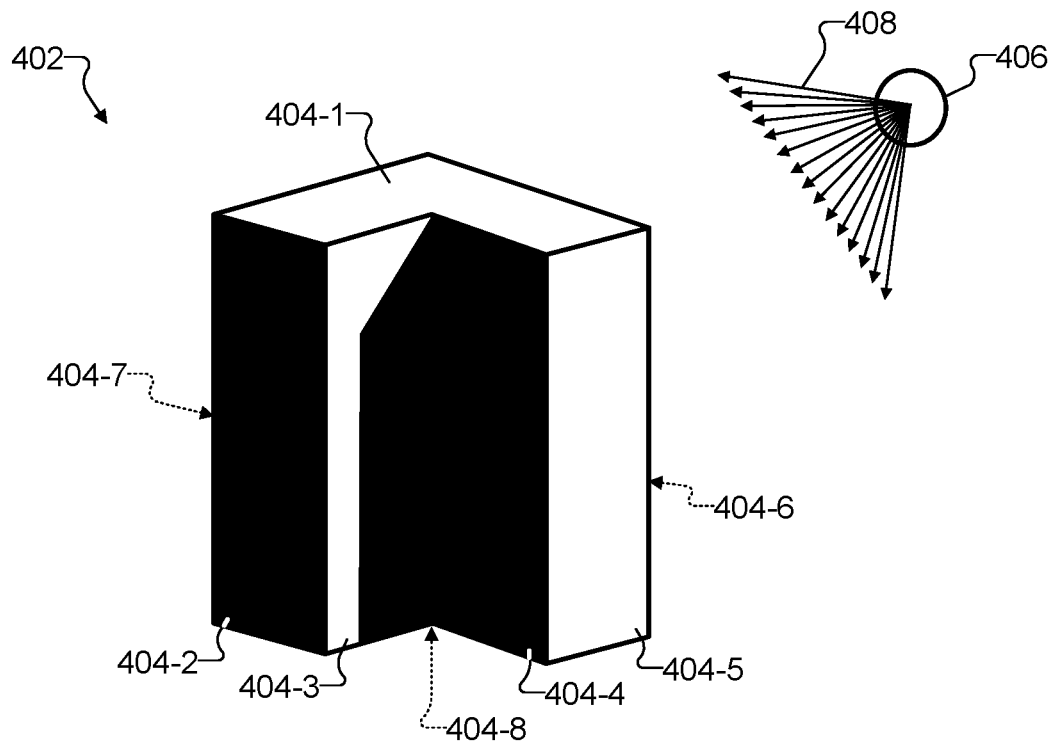
FIGS. 4A and 4B illustrate different views of an object represented by a three-dimensional ("3D") model and illuminated by a single light source according to principles described herein.
Figure 4B:
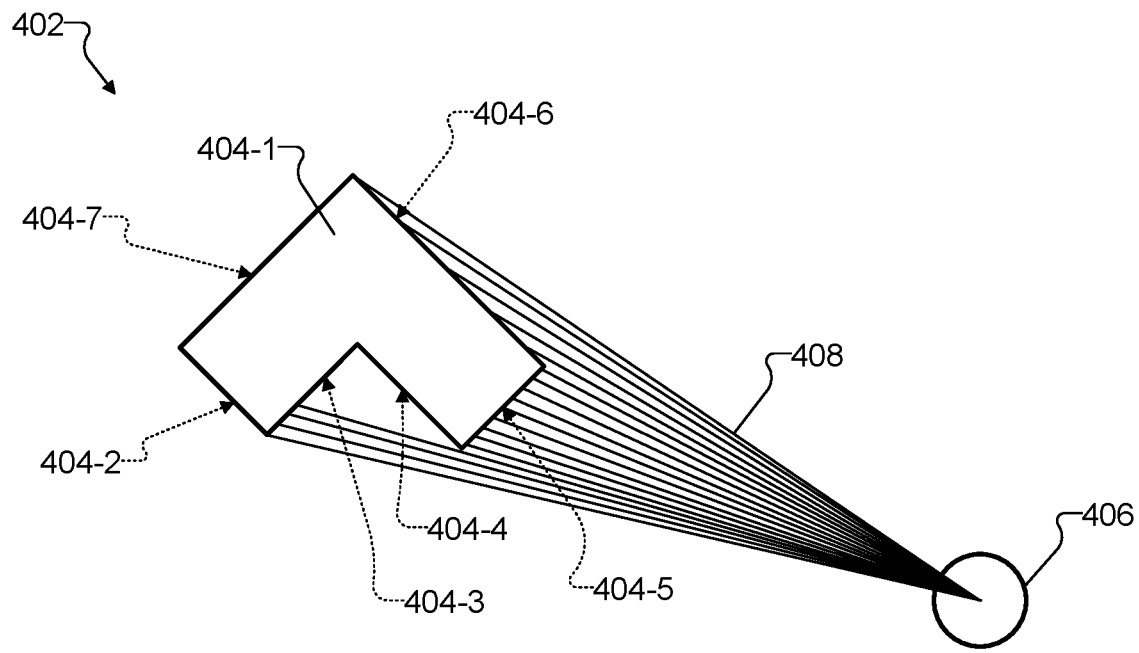

To illustrate a relatively simple example of how operation 302-2 may be performed for an exemplary object, FIGS. 4A and 4B show different views of an object represented by a 3D model and illuminated by a single light source. Specifically, FIG. 4A shows a perspective view of an object 402 implemented as a 3D geometric object having a plurality of faces 404 including a top face 404-1, a plurality of side faces 404-2 through 404-7, and a bottom face 404-8. It will be understood that certain faces of block 402 are not visible from the perspective shown in FIG. 4A and are thus pointed to by a reference designator including a dotted arrow rather than a solid line. More particularly, as shown, faces 404-6 through 404-8 will be understood to be on parts of object 402 that are not visible in FIG. 4A.

Figure 5:
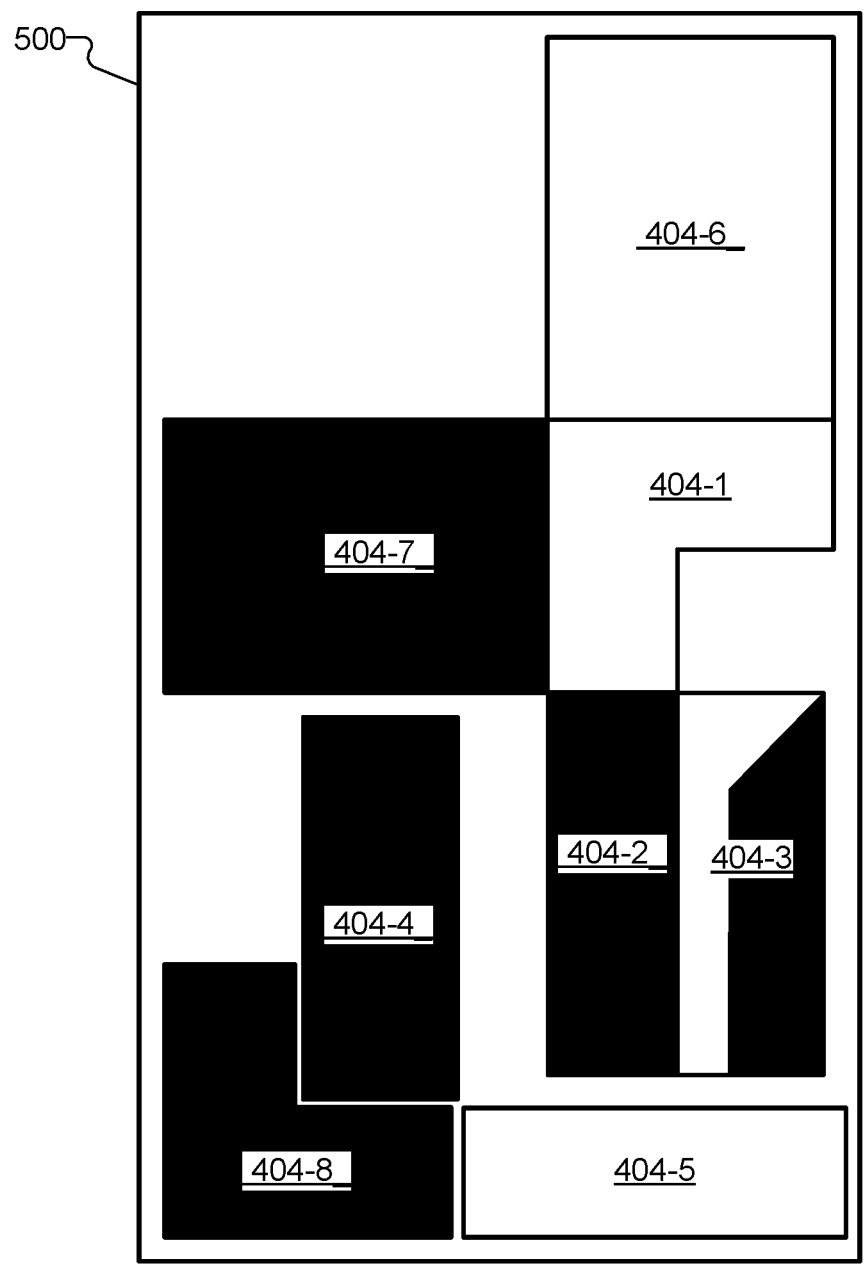
FIG. 5 illustrates an exemplary lightmap for the object represented by the 3D model as illuminated by the single light source in FIGS. 4A and 4B according to principles described herein.

Also shown in FIG. 4A is a light source 406, which will be understood for the purposes of FIGS. 4A, 4B, and 5 to be a direct light source and the only light source accounted for by operation 302-2 in this example. As shown, light source 406 illuminates object 402 by way of a plurality of virtual light rays 408 which system 100 determines may intersect with the various faces of object 402 based on the illustrated scene geometry (i.e., based on the location of object 402 with respect to light source 406).

FIG. 4B shows a top view of object 402 and light source 406 to more clearly illustrate how virtual light rays intersect with certain surface points of certain faces 404 of object 402 (e.g., faces 404-5 and 404-6, and part, but not all, of face 404-3) while not providing any illumination for surface points of other faces 404 of object 402 (e.g., faces 404-2, 404-4, 404-7, and part, but not all, of face 404-3). While the perspective of the top view provided by FIG. 4B does not necessarily clarify how virtual light rays 408 produced by light source 406 may interact with the top and bottom faces 404-1 and 404-8, it will be understood that top face 404-1 is illuminated by light source 406 in this scene geometry while bottom face 404-8 is not.

FIG. 5 illustrates an exemplary lightmap 500 for object 402 represented by the 3D model as illuminated by light source 406 in the scene geometry of FIGS. 4A and 4B. As shown, lightmap 500 may be implemented as a two-dimensional image upon which each surface point of each face 404 of object 402 is given a lighting value. Specifically, as mentioned above, for this example of FIGS. 4A, 4B, and 5, only a single light source (i.e., light source 406) is accounted for. As a result, each surface point of each face 404 is shown in FIG. 5 to be either white (if illuminated directly by light source 406) or black (if not illuminated directly by light source 406). Specifically, as shown, all surface points of lightmap 500 associated with faces 404-1, 404-5, and 404-6 are white; all surface points of lightmap 500 associated with faces 404-2, 404-4, 404-7, and 404-8 are black; and surface points of face 404-3 are either white or black depending on whether the surface points are in the shadow depicted in FIG. 4A. While FIG. 5 is illustrated in black and white, it will be understood that surface points of FIG. 5 might be more precisely illustrated by various shades based on the orientation and distance of each face 404 with resect to light source 406.

As illustrated in FIG. 5, lightmap 500 is a representation of how each surface point (e.g., each pixel, each voxel, etc.) on each face 404 of object 402 is to be illuminated when object 402 is rendered (i.e., when texture and lighting data is applied to the mesh of the 3D model for object 402 during the final rendering performed by media player device 206). In examples involving only white light, a lightmap such as lightmap 500 may include only black, white, and grayscale values. However, in many real-world examples, primary and secondary light sources may produce or reflect light that is not completely white. Accordingly, lightmaps such as lightmap 500 may include not only represent the brightness of light at each surface point, but also the color of light that is to be simulated at each surface point. It will be understood that such colors represent the color of light intersecting surface points and is not to be confused with color properties of the surface point texture itself, which may be represented in texture data maps that are similar in concept to lightmap 500 but represent surface properties (e.g., texture properties, color properties, etc.) of the surface of the object, rather than the light intersecting with the surfaces. In some implementations, lightmap data and texture data may be stored and handled separately, while, in other implementations, lightmap data and texture data may be multiplied so as to be stored and handled as a consolidated data structure (e.g., a consolidated texture-lightmap or the like).

Conventionally, lightmaps are computed once and maintained as static lightmaps. Shading and shadows are then either not accounted for or are added by way of shortcuts (e.g., putting a dark spot under an object, etc.) that do not actually account for light sources and raytracing and therefore result in renderings that are at least somewhat lacking in realism. In contrast, due to the bifurcation of rendering the lightmaps (performed on a MEC server having a wealth of state-of-the-art GPU resources at its disposal) and performing other rendering tasks (performed on the media player device), methods and systems described herein relate to dynamic lightmaps that may be continuously updated. For example, dynamic lightmaps may be continuously updated for each frame as the scene geometry of a 3D scene changes (e.g., as the spatial relationship between object 402 and light source 406 changes over time). Accordingly, if lightmap 500 is continuously updated in this way, it will be understood that lightmap 500 may be referred to as a "dynamic lightmap" (e.g., dynamic lightmap 500).

As mentioned above, a light source that illuminates an object within a 3D scene may be a direct light source generating virtual light rays that are traceable, via the raytracing, from the direct light source immediately to the object. FIGS. 4A, 4B, and 5 have illustrated an example where only one such light source has been accounted for. Specifically, direct light source 406, which may represent the sun or a light bulb or another such primary source of light, has been illustrated. It will be understood, however, that just as multiple objects may be included and accounted for in a 3D scene (e.g., by way of a set of dynamic lightmaps associated with the different objects), it may be desirable in certain 3D scenes to account for multiple light sources as objects and/or the light sources dynamically move in the 3D scene. For example, some of these light sources may be direct light sources such as light source 406, while other light sources illuminating objects within the 3D scene may be indirect light sources (e.g., object surfaces, ambient light sources such as a window or a cloudy sky, etc.) that reflect virtual light rays generated by direct light sources or reflecting from additional indirect light sources. As such, the virtual light rays are traceable, via the raytracing, from the indirect light source to the object.

Figure 6A:
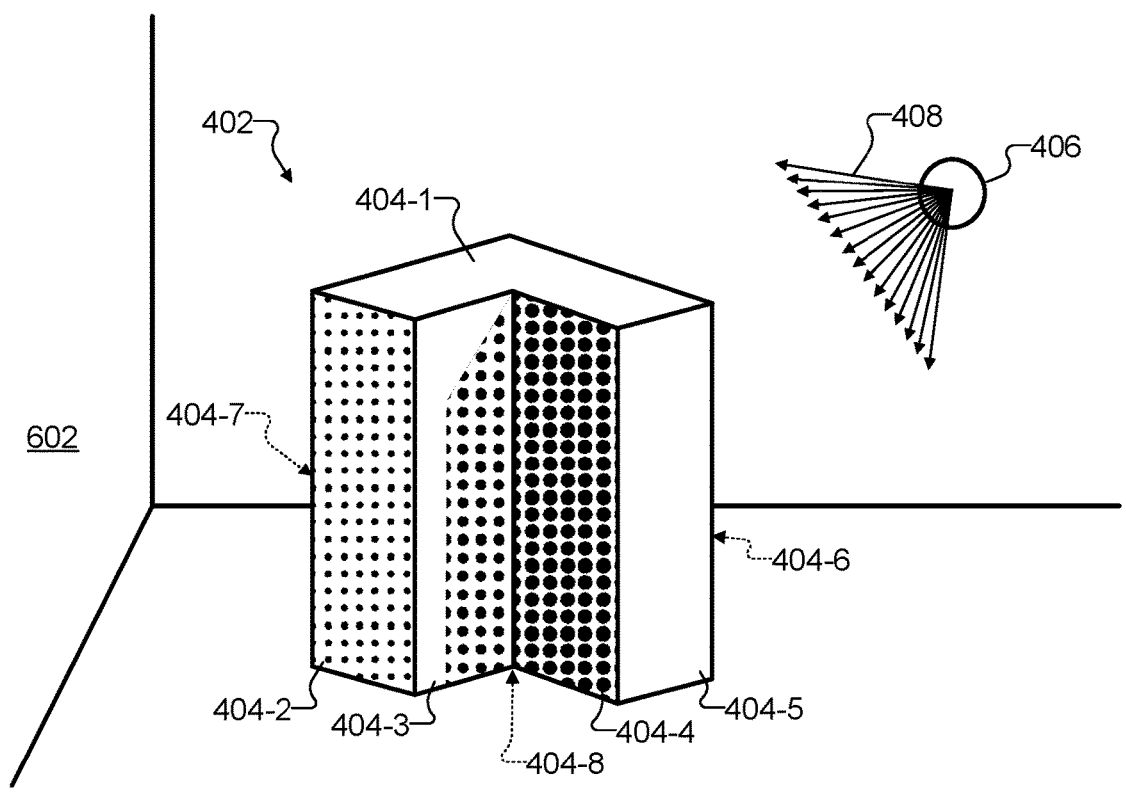
FIGS. 6A and 6B illustrate different views of an object represented by a 3D model and illuminated by multiple light sources according to principles described herein.
Figure 6B:
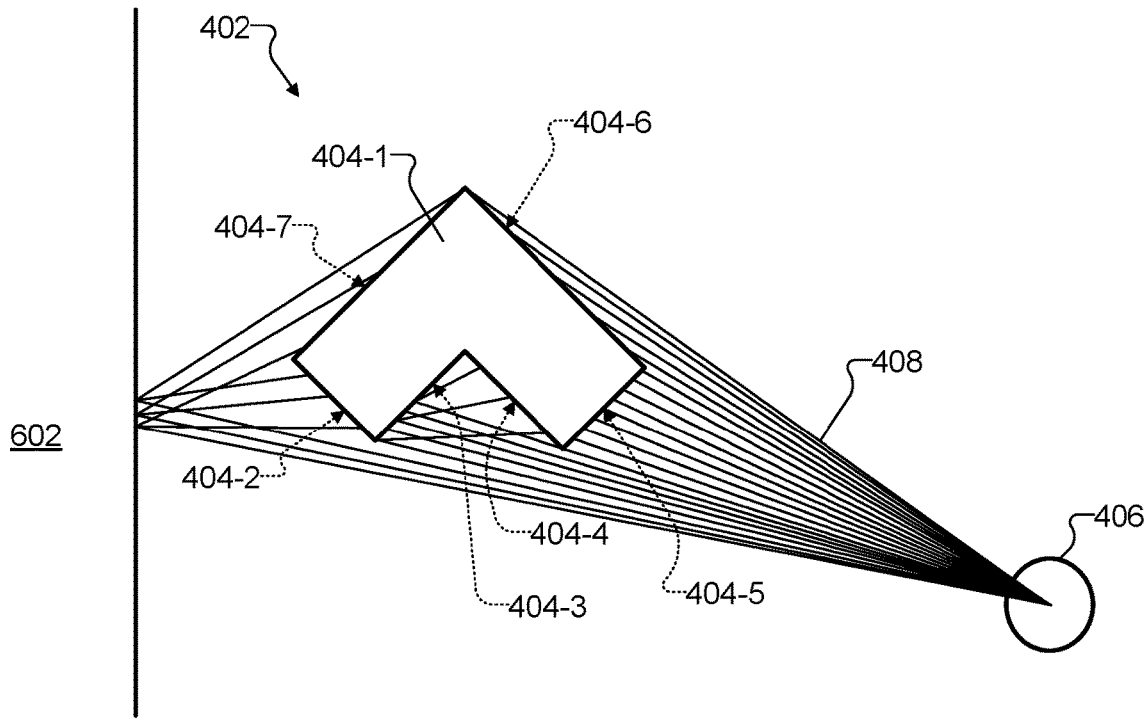
Figure 7:
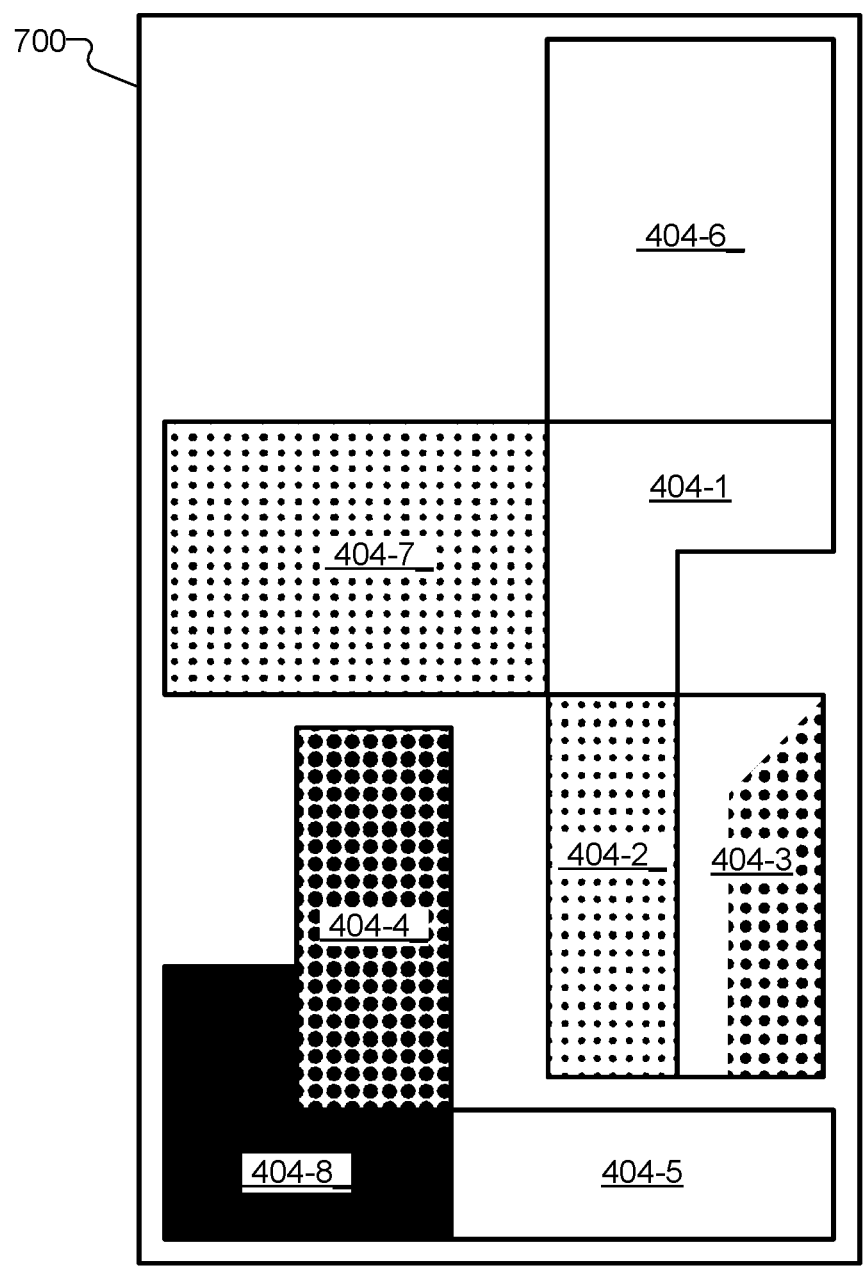
FIG. 7 illustrates an exemplary lightmap for the object represented by the 3D model as illuminated by the multiple light sources in FIGS. 6A and 6B according to principles described herein.

To illustrate, FIGS. 6A, 6B, and 7 are similar to FIGS. 4A, 4B, and 5, respectively, except that, in this example, both direct light source 406 and indirect light sources are accounted for. As a result, the lighting of object 402 in FIGS. 6A, 6B, and 7 is more complex so as to account for virtual light rays 408 that originate directly from light source 406, as well as virtual light rays 408 that reflect from surfaces of a wall object 602 in the scene, from surfaces of object 402 itself, and so forth. Specifically, as with FIG. 5A described above, FIG. 6A shows the same object 402 with the same faces 404-1 through 404-8 being illuminated by the same direct light source 406 producing virtual light rays 408. Wall object 602 shown in FIG. 6A, however, is new to this example and was not present in FIG. 4A. As shown in FIG. 6B, some of virtual light rays 408 are shown to reflect from wall object 602 to then illuminate, for example, faces 404-2 and 404-7 of object 402. As a result, while faces 404-2 and 404-7 are still not fully illuminated like, for instance, faces 404-1 and 404-5, a lighter shadow is shown on these faces than was depicted in the example of FIG. 4B. Similarly, as further shown, reflections of certain virtual light rays 408 from face 404-3 onto face 404-4 and other similar reflections being accounted for have caused faces 404-3 and 404-4 to similarly be associated with more nuanced lighting information than in the earlier example (e.g., depicted by way of different shading represented by different size and spacing of dots depicted in FIG. 6A in place of the completely black shading of FIG. 4A).

FIG. 7 illustrates an exemplary lightmap 700 for object 402 represented by the 3D model as illuminated by the multiple light sources in FIGS. 6A and 6B (e.g., light source 406, wall object 602, etc.). Similar to lightmap 500 described above, lightmap 700 is shown to be implemented as a two-dimensional image upon which each surface point of each face 404 of object 402 is given a lighting value. Because direct and indirect light sources are accounted for in this example, however, each surface point of each face 404 is shown in FIG. 7 to be black, white, or various shades of gray (indicated by different patterns of differently-sized dots). Specifically, as with lightmap 500, all surface points of lightmap 700 associated with faces 404-1, 404-5, and 404-6 are still white as a result of virtual light rays 408 received directly from direct light source 406. However, in contrast to the black surface points for faces 404-2, 404-4, 404-7, and 404-8 in lightmap 500, lightmap 700 shows that only face 404-8 (which will be understood to be facing down into the ground so as to block all light) is completely black, while each of faces 404-2, 404-4, 404-7, and the shaded part of face 404-3, are different shades of gray representing how much light is reflected to each surface from indirect light sources (e.g., objects in the room such as wall object 602, other faces of object 402, or other objects not explicitly shown in FIGS. 6A and 6B).

Various advantages may arise from accounting for secondary, indirect light sources in dynamic lightmap 700 in the ways described above. As one example, shading and shadows are made to look extremely realistic due to the fact that virtual light rays are simulated and modeled propagating through a scene rather than inaccurate shortcuts being taken. Another exemplary benefit is that dynamic lightmaps such as dynamic lightmap 700 may serve as irradiance caches to perform temporal convergence of the rendering equation. If lighting data is maintained for each surface point in the scene (e.g., in an overall set of dynamic lightmaps including dynamic lightmap 700 and other dynamic lightmaps for other objects in the scene), system 100 has no need to trace virtual light rays for multiple bounces on multiple objects because, as soon as a virtual light ray is traced from one surface point to another surface point for which lighting data is maintained, the second surface point may be treated as an indirect light source, thereby caching the irradiance associated with that point. As a result, even without increasing ray sample counts to explicitly account for multiple bounces, the lighting data for the whole scene will become progressively better for each dynamic lightmap generated and updated as a frame sequence of lightmaps progresses. By allowing dynamic lightmaps to serve as irradiance caches in this way, system 100 may avoid having to perform raytracing of multiple reflections even while the dynamic lightmaps being maintained become progressively more accurate from frame to frame.

Returning to FIG. 3, operation 302-2 may include raytracing operations such as described above to generate and/or update lightmaps like lightmaps 500 and 700. As mentioned, in some examples, lightmaps such as lightmaps 500 and 700 may be continuously updated (e.g., frame by frame) as dynamic lightmaps. Specifically, for example, system 100 may generate a dynamic lightmap for a first rendered frame associated with a particular scene geometry. The first rendered frame may be included within a rendered frame sequence that further includes a plurality of additional rendered frames associated with additional scene geometries in which the object and the light source are in different locations within the 3D scene. System 100 may then continuously update, for each of the additional rendered frames in the plurality of additional rendered frames included within the rendered frame sequence, the dynamic lightmap to correspond to the additional scene geometries in which the object and the light source are in the different locations within the 3D scene.

To illustrate, FIG. 3 shows that, as this dynamic lightmap is generated and continuously updated as a dynamic lightmap, communication 306-3 ("Lightmap Frame Sequence") may be transmitted from system 100 to media player device 206. For example, the dynamic lightmap of communication 306-3 may be provided by system 100 to media player device 206 by streaming an encoded video stream representative of a lightmap frame sequence that includes a sequence of lightmap frames each depicting the dynamic lightmap as generated or updated for a respective time during a time period throughout which the 3D scene is presented by media player device 206. To achieve this, any video encoding and/or streaming technologies may be employed as may serve a particular implementation.

To illustrate, FIG. 8 shows an exemplary lightmap frame sequence with a corresponding rendered frame sequence along a timeline for a 3D scene being presented to user 208 by media player device 206. Specifically, a plurality of lightmap frames 802-1 through 802-6 (individually referred to herein as lightmap frames 802 and collectively referred to herein as lightmap frame sequence 802) are shown along the timeline to correspond to respective rendered frames 804-1 through 804-4 (e.g., rendered frame 804-1 corresponding to lightmap frame 802-1, rendered frame 804-2 corresponding to lightmap frame 802-2, etc.). It will be understood that rendered frames corresponding with lightmap frames 802-5 and 802-6 have not yet been generated at the "Current Time" on the timeline, and are thus not shown in FIG. 8.

As shown in FIG. 8, dotted lines indicate which lightmap frames 802 correspond with which rendered frames 804. For example, each rendered frame 804 will be understood to be generated based on an application of the lightmap frame 802 to which the rendered frame 804 is connected. While each lightmap frame 802 is shown to be connected to exactly one corresponding rendered frame 804 in FIG. 8, it will be understood that this relationship may not always be one-to-one as FIG. 8 depicts. For example, if bandwidth limitations or other factors limit the number of lightmap frames 802 that are provided to media player device 206 to be fewer than the number of rendered frames 804 being generated, a single lightmap frame 802 may serve multiple rendered frames 804. In certain such examples, rather than using the same lightmap frame 802 on multiple rendered frames 804, media player device 206 may interpolate between two consecutive lightmap frames 802 to generate an intermediate or interpolated lightmap frame 802 that can be applied to one or more rendered frames 804. In any of these ways, many or all of the benefits of bifurcating graphics rendering described herein may be achieved (at least to some degree) while allowing great flexibility in the amount of real-time processing performed by system 100, the amount of data transmitted over the communication link between system 100 and media player device 206, and so forth.

System 100 and media player device 206 may coordinate with one another to correlate lightmap frames 802 and rendered frames 804 in any suitable manner. For example, in certain implementations in which media player device 206 is configured to present the 3D scene in the sequence of rendered frames 804 that are each associated with different respective times during a time period throughout which the 3D scene is presented, system 100 may be configured, as part of providing the dynamic lightmap, to provide metadata with each dynamic lightmap frame 802. For example, as shown in FIG. 8, the metadata provided in each lightmap frame 802 may be indicative of a timestamp for the dynamic lightmap (e.g., "Time=1001," "Time=1002," etc.). Rendered frames 804 may each also be associated with a particular timestamp and media player device 206 may be configured to apply a particular lightmap frame 802 that is received from system 100 to a 3D model being rendered in a particular rendered frame 804 based on the respective timestamps. For example, as shown, lightmap frame 802-1 may be applied to one or more 3D models rendered in rendered frame 804-1 because both of these frames include timestamps indicative of the same time (i.e., "Time=1001").

It will be understood that each rendered frame 804-1 in FIG. 8 may be representative of a rendered image depicting a particular scene geometry of the 3D scene (e.g., a scene geometry associated with the particular moment in time indicated in the timestamp) from a viewpoint selected by user 208. Accordingly, if there are multiple objects visible to user 208 from the selected viewpoint, each rendered frame 804 may depict multiple objects that are associated with different dynamic lightmaps (e.g., a first lightmap such as lightmap 700 associated with object 402, a second lightmap associated with wall object 602, a third lightmap associated with the ground, etc.). Accordingly, in some implementations, each rendered frame 804 may actually be understood to correspond to more than one lightmap frame 802 (not explicitly shown). For example, rendered frame 804-1 could correspond to multiple separate lightmap frames 802-1 with the same timestamp (e.g., one for object 402, one for wall object 602, one for the ground object, etc.).

In other implementations, each lightmap frame 802 may represent dynamic lightmaps for a plurality of different objects. For example, a plurality of lightmaps associated with a plurality of objects may all be arranged (e.g., tiled) together onto a single lightmap frame. More specifically, system 100 may tile, within each lightmap frame 802, a dynamic lightmap for object 402 and an additional dynamic lightmap for an additional object (e.g., wall object 602) represented by an additional 3D model and included within the 3D scene. System 100 may thus provide this lightmap frame 802 to media player device 206, and, upon receiving the lightmap frame 802, media player device 206 may extract, as part of the presenting of the 3D scene to user 208, the dynamic lightmap and the additional dynamic lightmap from the tiled lightmap frame 802 prior to performing the rendering that includes the applying of the dynamic lightmaps to the respective 3D models.

As mentioned above, a primary benefit for bifurcating the rendering of lightmaps to MEC server 202 is that the computationally-intensive raytracing processing needed to perform frame-by-frame dynamic lightmaps for each of the objects in a 3D scene may only be performed by a computer, such as MEC server 202, that includes significant graphics processing resources (i.e., more resources than may be available to media player device 206 alone). However, another significant benefit of bifurcating the rendering in this way relates to how important different aspects of rendering are to the continuity of experience of user 208. Certain rendering aspects such as rendering the geometry (e.g., drawing each object) from the perspective of user 208 may be crucial to the continuity sensed by user 208 as user 208 experiences the content. For example, if any amount of frame stuttering, dropped frames, or inaccurately rendered geometry occurs, user 208 may perceive this as a distracting glitch in the content. In some cases, such glitching could interfere with fast-paced gameplay, cause a user to experience extended reality motion sickness, or result in other negative consequences. Such consequences do not necessarily result, however, from glitches in other aspects of rendering (e.g., lightmap rendering) if the geometry of a scene is consistently rendered at a steady frame rate from the user's point of view.

Specifically, for example, if lightmaps associated with one rendered frame 804 are used for several consecutive rendered frames 804 (e.g., rather than each rendered frame 804 using updated, unique lightmaps), user 208 may not notice or perceive the slight lighting inaccuracy this would cause. Alternatively, user 208 may perceive the change but may not be adversely affected by it (e.g., experiencing motion sickness, having gameplay interfered with, etc.). Accordingly, lightmap generation is an ideal rendering task to outsource from media player device 206 to system 100 on MEC server 202 because, even if temporary connectivity issues arise with communication link 204 that cause a few lightmap frames 802 to not arrive in time to be applied to corresponding rendered frames 804 (e.g., until the connectivity issues are resolved), media player device 206 may continue to employ previous lightmap frames 802 that have been received, and user 208 is unlikely to perceive or be adversely affected while experiencing the 3D scene.

Additionally or alternatively, as shown in FIG. 8, system 100 may have sufficient data to generate and provide lightmap frames 802 for at least a few frames ahead of a current time for which rendered frames 804 are being rendered and presented by media player device 206. For example, the providing of the dynamic lightmaps in lightmap frames 802 may include providing one or more predicted updates to the dynamic lightmaps for one or more future times during the time period. Specifically, as shown, the future times are later than a current time associated with a rendered frame being rendered and/or presented by media player device 206 as the one or more predicted updates are provided (e.g., rendered frame 802-4). To illustrate, FIG. 8 shows that lightmap frame 802-4 is fully generated and provided to media player device 206 even while rendered frame 804-4 (the frame being rendered at the current time) is still being rendered. Additionally, lightmap frames 802-5 and 802-6 are shown to have also already been provided by system 100 before media player device 206 has even begun rendering frames for times 1005 and 1006 (i.e., frames that would be labeled as rendered frames 804-5 and 804-6 if they were shown in FIG. 8).

Returning to FIG. 3, once media player device 206 receives communication 306-3 from system 100 with lightmap frame sequence 802, performance 300 shows that media player device 206 may be configured to perform operations 304-1 ("Render Images") and 304-2 ("Apply Dynamic Lightmap") based on the received lightmap frame sequence. It will be understood that, in certain implementations, communications 306 may be ongoing, streaming communications and operations 302 and 304 may be performed concurrently and in real time as data is exchanged in these data streams.

Operation 304-1 may be performed in any suitable way. For example, for each rendered frame 804 generated by media player device 206, polygons (e.g., triangles, etc.) associated with 3D models of various objects in the 3D scene may be drawn in an image that is to represent the 3D scene from a particular viewpoint selected by user 208. Texture may be applied to each polygon based on a texture map. Thereafter, operation 304-2 may be performed (e.g., as part of the rendering of the image in operation 304-1) to apply lighting data represented in the dynamic lightmap received from system 100. As this rendering is performed, it will be understood that media player device 206 may perform any conventional data and graphics processing tasks (e.g., decoding video received from system 100, rendering meshes and textures, etc.) as may serve a particular implementation. However, because an updated, highly-accurate (e.g., raytraced) dynamic lightmap is available for use in applying lighting data to the rendering, the image generated by media player device 206 may appear significantly more realistic than would conventionally rendered images rendered by applying non-dynamic and/or non-raytraced lightmaps.

In certain examples, the bifurcated rendering of dynamic lightmaps and rendered images performed, respectively, by system 100 and media player device 206 may be associated with the same level of detail. That is, in these examples, the level of detail to which dynamic lightmaps are rendered by system 100 may be the same as the level of detail for which polygons are rendered in rendered frames by media player device 206.

In other examples, however, the level of detail rendered by system 100 and media player device 206 may not necessarily be the same. For example, dynamic lightmaps generated or updated by system 100 based on raytracing may be generated or updated at a first level of detail, while images rendered by media player device 206 may include renderings of 3D model at a second level of detail that is lower than the first level of detail. As a result, the rendering of the images may include applying the dynamic lightmap generated or updated at the first level of detail to the 3D model rendered at the second level of detail that is lower than the first level of detail. As will be described below, this may provide various benefits because heavy computations performed by system 100 on MEC server 202 may be leveraged to provide a rich level of detail to be enjoyed by the user without media player device 206 (which, as described above, may lack the wealth of resources of MEC server 202) being required to perform such intensive computation to achieve the high level of detail.

Figure 9A:
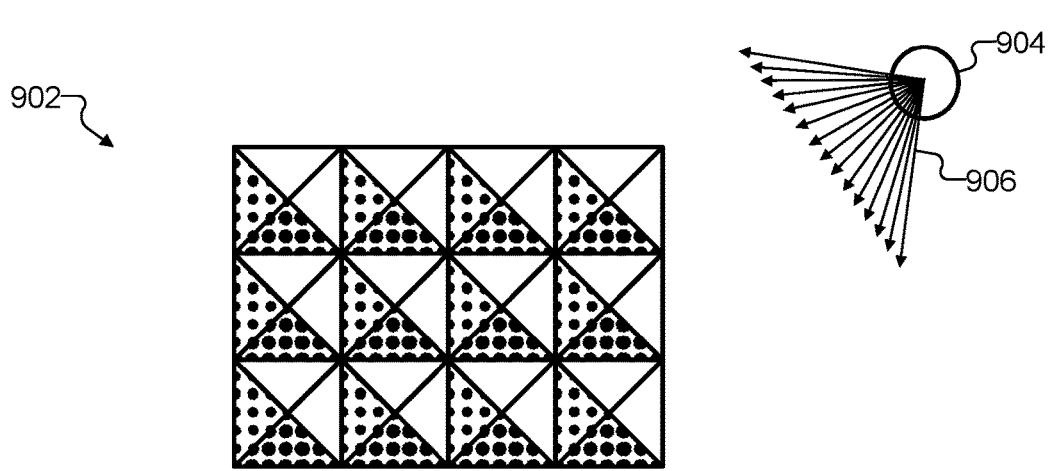
FIGS. 9A-9E illustrate exemplary aspects of lightmaps being generated and images being rendered at different levels of detail according to principles described herein.
Figure 9B:
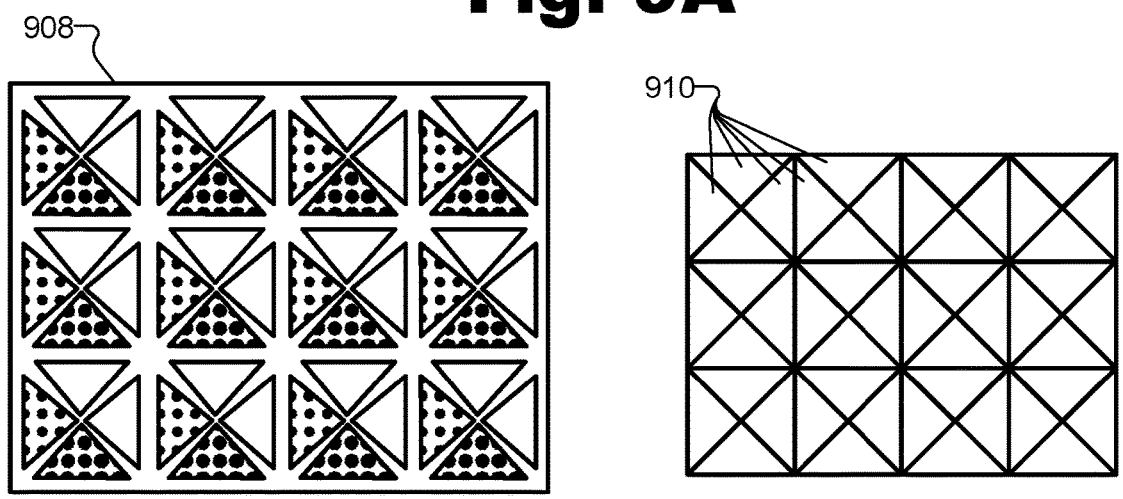
Figure 9C:
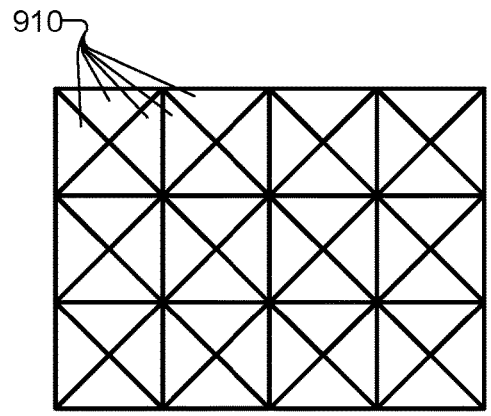

To illustrate, FIGS. 9A-9E illustrate exemplary aspects of lightmaps being generated and images being rendered at different levels of detail. Specifically, as shown in FIG. 9A, an object 902 (or a portion of such an object) having a relatively intricate, bumpy texture is illuminated by a direct light source 904 that shines virtual light rays 906 to cause the pattern of light and shadow shown in FIG. 9A. FIG. 9B illustrates a lightmap 908 that accounts individually for each polygon that is to be applied by media player device 206 if media player device 206 renders object 902 at a relatively high level of detail. For example, as shown in FIG. 9C, media player device 206 may individually render each and every polygon 910 of object 902 (implemented as triangles in this example) and may use lightmap 908 to apply corresponding lighting data to each of these polygons 910.

Figure 9D:
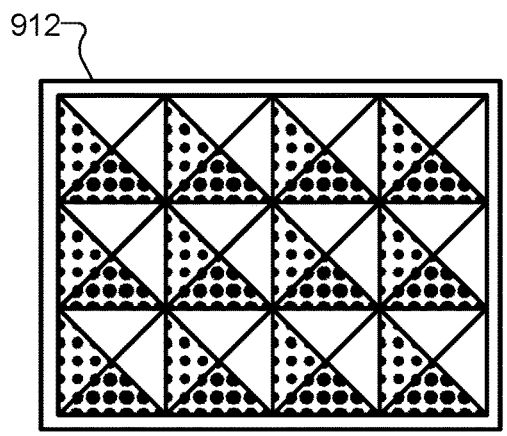
Figure 9E:
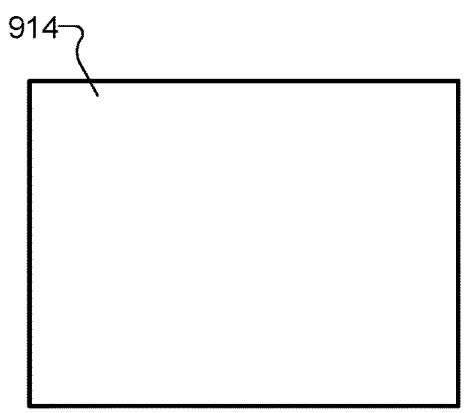

FIGS. 9D and 9E, however, show an alternative approach that may result in a lighter computing load for media player device 206. In this example, system 100 may provide a lightmap 912 that, like lightmap 908, accounts for all of the lighting information at a high level of detail. However, unlike lightmap 908, lightmap 912 is configured to be applied to a single polygon 914 (implemented as a rectangle in this example, as shown in FIG. 9E) that is rendered at a different (i.e., lower) level of detail than lightmap 912. By applying lightmap 912 to polygon 914, rather than applying lightmap 908 to the large number of polygons 910, media player device 206 may conserve significant processing power while, at least in certain contexts, still rendering an image of object 902 that appears to have all the high level of detail intact (e.g., so as to be indistinguishable to the user from an image rendered using matched levels of detail as illustrated in FIGS. 9B and 9C).

The respective levels of detail at which dynamic lightmaps and images are generated, updated, or otherwise rendered may be defined based on any suitable factors as may serve a particular implementation. For example, the level of detail at which lightmap 912 is generated may be based on a size of object 902 as presented within the 3D scene, based on a proximity (within the 3D scene) of a location of object 902 to a location associated with the viewpoint selected by the user, or the like. Accordingly, in contexts where the user may be unable to fully appreciate a high level of detail (e.g., because object 902 is too small or far away from the user's selected viewpoint), processing resources may be preserved by not generating even the dynamic lightmap at an unnecessarily high level of detail.

Another advantage of being able to generate and provide lightmaps at different levels of detail (besides the processing resources potentially saved by system 100 and media player device 206) is that lightmaps associated with different levels of detail may be streamed at different times based on factors including that status of the connectivity between system 100 and media player device 206. For example, while media player device 206 continues to use the same rendering (e.g., polygon 914 in FIG. 9E), system 100 may provide different versions of lightmap 912 that have different amounts of detail shown. For example, when the viewpoint moves away from object 902, system 100 may switch from providing a higher level of detail version to a lower level of detail version of lightmap 912. As another example, as the connectivity between system 100 and media player device 206 improves or degrades (e.g., based on network conditions), different versions of lightmap 912 associated with different levels of detail may be automatically provided in a manner analogous to a variable bit rate streaming scheme.

As described above, systems and methods described herein may facilitate the real-time rendering of high-quality graphics in various types of applications and use cases. Certain special considerations may be made, however, for some of the applications and use cases that have been described. For example, an augmented or mixed reality use case will be considered in which it is desirable for a virtual object (e.g., an augmentation) to be integrated into an image of the real-world environment in which the user is located.

In conventional augmented reality implementations, virtual objects are overlaid onto an image of the real-world environment as if the virtual objects are actually located in the real-world environment, but the real-world lighting of the real-world environment is not accounted for (or at least is not fully accounted for by means of raytracing and so forth). In order to make a virtual object placed in a real-world environment appear as realistic as possible, a lightmap management system implemented by a MEC server (e.g., such as system 100 implemented by MEC server 202) may perform any of the following operations to account for the real-world lighting of the environment.

First, the lightmap management system may access graphics data representative of a 3D model of an object that is to be added, within an extended reality representation (e.g., an augmented reality representation, a mixed reality representation, a virtual reality representation, etc.) of a real-world environment, as a virtual augmentation to the real-world environment and that includes a surface point at a first location within the real-world environment. The lightmap management system may receive, from a light detection system located within the real-world environment, data indicative of a second location within the real-world environment. For example, the second location may represent a location from which a real-world light source (e.g., a real-world direct or indirect light source) is to illuminate the surface point of the object when the object is added to the real-world environment. The lightmap management system may generate or update a dynamic lightmap for the object represented by the 3D model. For example, the lightmap management system may generate or update the dynamic lightmap based on raytracing of virtual light rays from the second location to the first location. The dynamic lightmap may be associated with a particular scene geometry in which the surface point of the object is at the first location and is illuminated by the real-world light source from the second location.

In response to the generating or updating of the dynamic lightmap, the lightmap management system may provide the dynamic lightmap to a media player device communicatively coupled to the MEC server. The media player device may be located within the real-world environment so as to present the extended reality representation of the real-world environment to a user of the media player device from a viewpoint of the media player device within the real-world environment. As part of the presenting of the extended reality representation of the real-world environment by the media player device, the media player device may render an image that depicts the particular scene geometry from the viewpoint of the media player device within the real-world environment (e.g., the viewpoint selected by the user based on where the user has moved the media player device within the environment). This rendering may include applying the dynamic lightmap to the 3D model to thereby make the lighting on the object account for the real-world lighting in the scene and to make that object appear to actually be included in the scene more convincingly.

Figure 10:
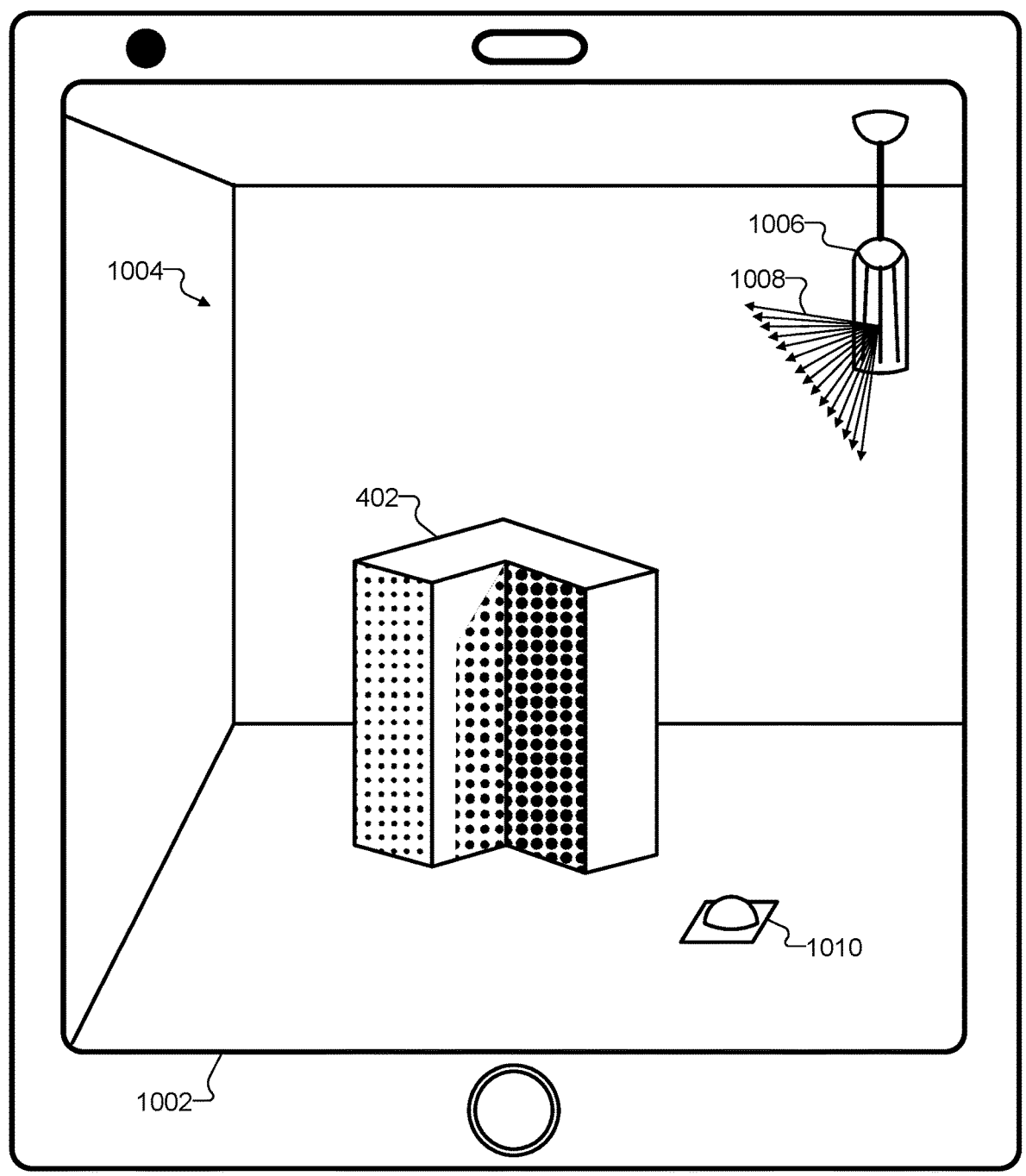
FIG. 10 illustrates an exemplary extended reality representation of a real-world environment presented by an exemplary media player device according to principles described herein.

To illustrate, FIG. 10 shows an exemplary extended reality representation of a real-world environment presented by an exemplary media player device. Specifically, FIG. 10 illustrates an exemplary media player device 1000 displaying an image 1002 depicting a particular scene geometry in which a real-world environment 1004 (i.e., the same real-world environment in which media player device 1000 is located together with a user of media player device 1000 who is not shown in FIG. 10) includes a real-world light fixture 1006 shining light rays 1008 to a location at which object 402 is to be integrated as an augmentation or virtual object within real-world environment 1004.

As further shown in FIG. 10, a light detection system 1010 is also located within real-world environment 1004. Light detection system 1010 may be implemented as any suitable type of sensor configured to identify where real-world light originates within real-world environment 1004 and to provide data indicative of the locations of light sources to media player device 1000 and/or the lightmap management system (not shown in FIG. 10). Accordingly, light detection system 1010 will be understood to be communicatively coupled, directly or indirectly to either or both of media player device 1000 and the MEC server hosting the lightmap management system. In some examples, light detection system 1010 may be integrated with media player device 1000. For example, light detection system 1010 may be implemented using a camera built into media player device 1000.

The lightmap management system coupled to media player device 1000 may access data associated with the location of real-world light source 1006, as well as a location where object 402 is to be inserted as an augmentation. As a result, the lightmap management system may generate and/or update a dynamic lightmap for object 402 based on the data from light detection system 1010 in any of the ways described herein. Once the lightmap management system provides this dynamic lightmap to media player device 1000 (e.g., as a lightmap frame sequence or using any of the techniques described herein), media player device 1000 may apply the dynamic lightmap to the 3D model and render object 402 at the appropriate location in a manner that makes it appear (as shown) as though real-world light source 1006 and light rays 1008 are interacting with (e.g., casting shadows, shading, etc.) on object 402.

Figure 11:
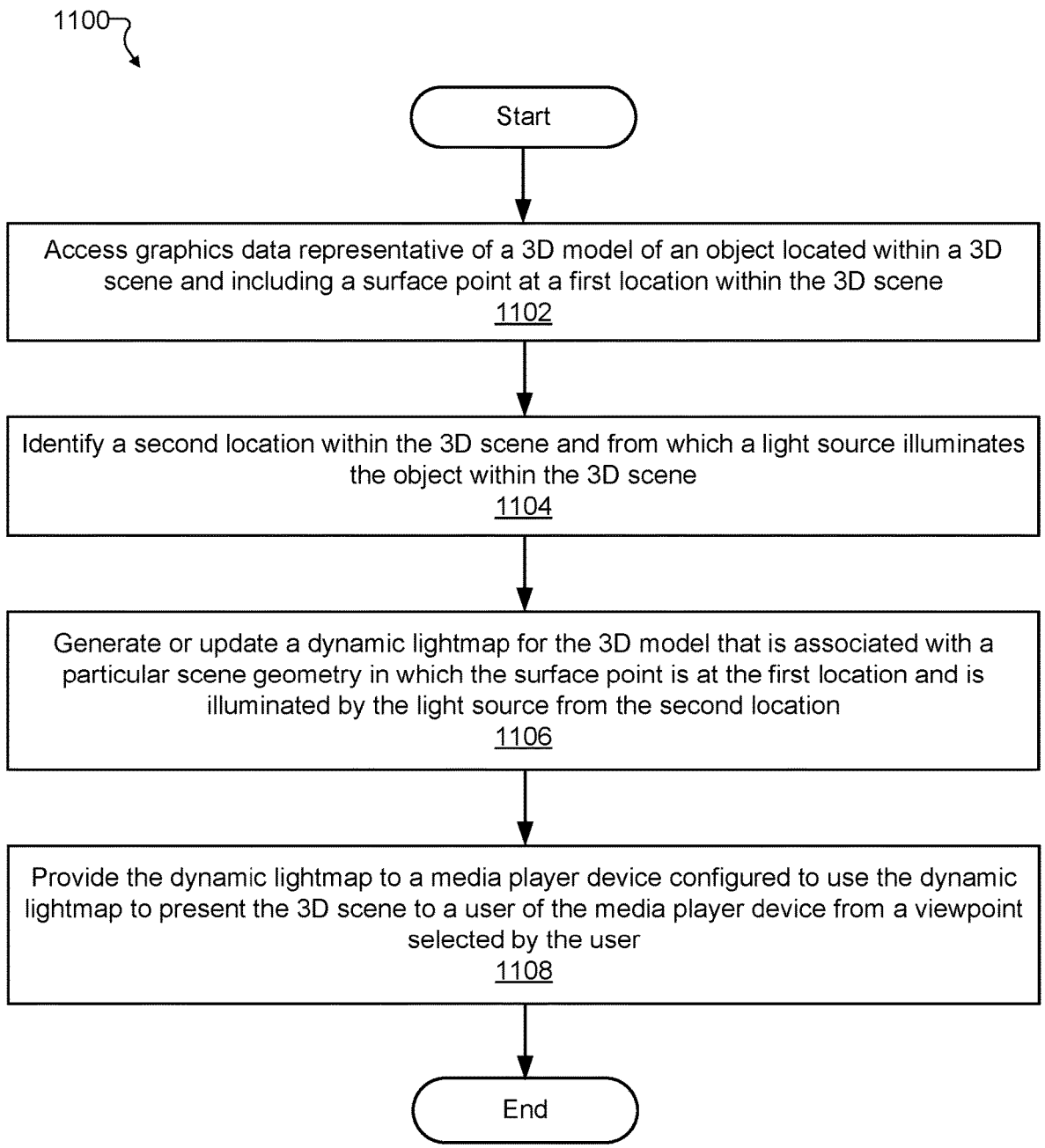
FIGS. 11 and 12 illustrate exemplary methods for bifurcating graphics rendering between a media player device and a MEC server according to principles described herein.

FIG. 11 illustrates an exemplary method 1100 for bifurcating graphics rendering between a media player device and a multi-access edge compute server. While FIG. 11 illustrates exemplary operations according to one embodiment, other embodiments may omit, add to, reorder, and/or modify any of the operations shown in FIG. 11. One or more of the operations shown in FIG. 11 may be performed by system 100, any components included therein, and/or any implementation thereof.

In operation 1102, a lightmap management system implemented by a MEC server may access graphics data representative of a 3D model of an object located within a 3D scene and including a surface point at a first location within the 3D scene. Operation 1102 may be performed in any of the ways described herein.

In operation 1104, the lightmap management system may identify by a second location within the 3D scene. The second location identified may be the location from which a light source illuminates the object within the 3D scene. Operation 1104 may be performed in any of the ways described herein.

In operation 1106, the lightmap management system may generate or update a dynamic lightmap for the object represented by the 3D model. For example, the dynamic lightmap may be generated or updated based on raytracing of virtual light rays from the second location to the first location such that the dynamic lightmap is associated with a particular scene geometry in which the surface point is at the first location and is illuminated by the light source from the second location. Operation 1106 may be performed in any of the ways described herein.

In operation 1108, the lightmap management system may provide the dynamic lightmap to a media player device communicatively coupled to the MEC server. For example, the lightmap management system may provide the dynamic lightmap in response to the generating or updating of the dynamic lightmap in operation 1106. The media player device to which the dynamic lightmap is provided may be configured to present the 3D scene to a user of the media player device from a viewpoint selected by the user. For instance, the media player device may present the 3D scene by performing operations including rendering an image that depicts the particular scene geometry from the selected viewpoint. In certain examples, such rendering may involve applying the dynamic lightmap to the 3D model. Operation 1108 may be performed in any of the ways described herein.

Figure 12:
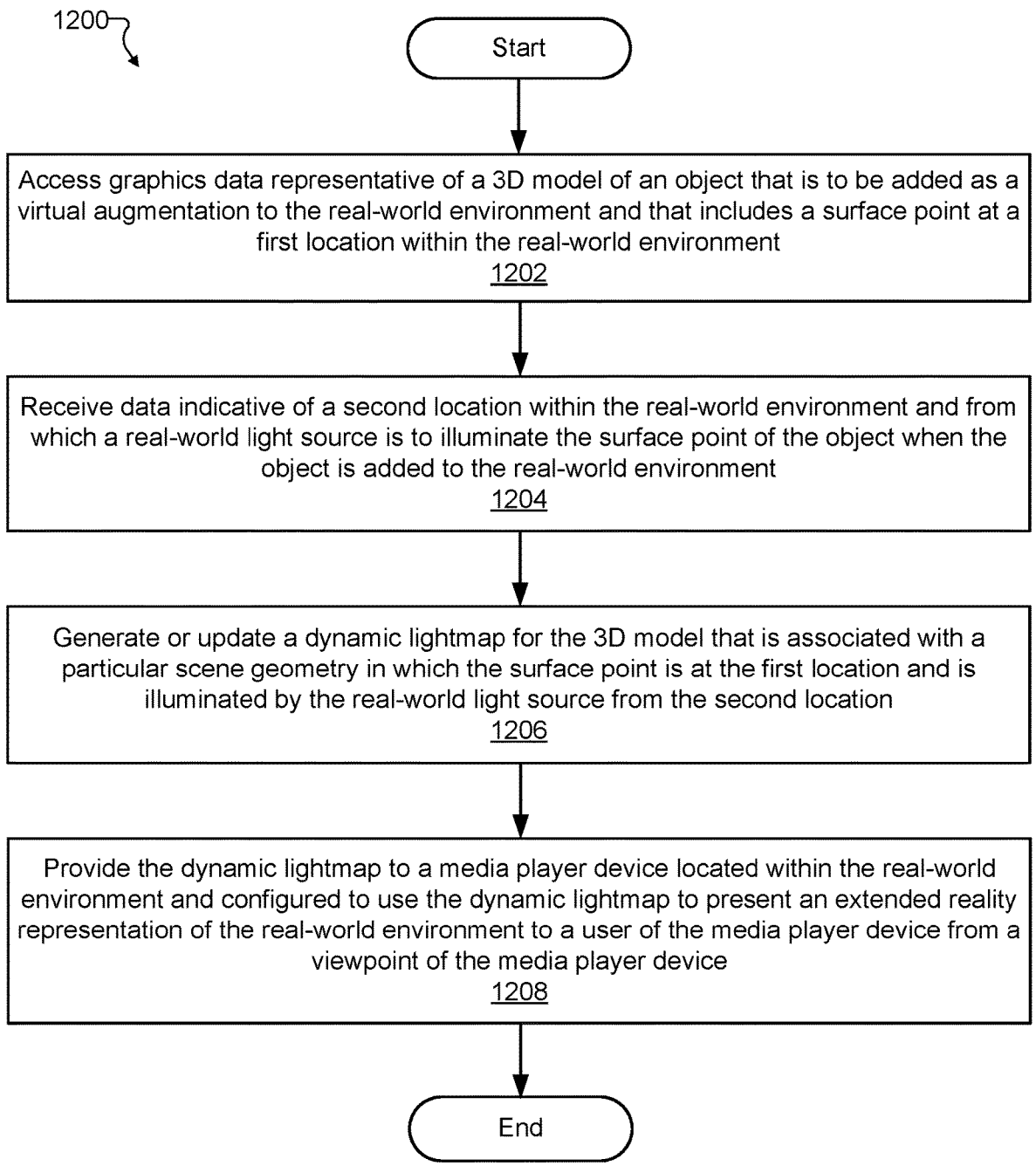

FIG. 12 illustrates an exemplary method 1200 for bifurcating graphics rendering between a media player device and a multi-access edge compute server. While FIG. 12 illustrates exemplary operations according to one embodiment, other embodiments may omit, add to, reorder, and/or modify any of the operations shown in FIG. 12. One or more of the operations shown in FIG. 12 may be performed by system 100, any components included therein, and/or any implementation thereof.

In operation 1202, a lightmap management system implemented by a MEC server may access graphics data representative of a 3D model of an object that is to be added, within an extended reality representation of a real-world environment, as a virtual augmentation to the real-world environment and that includes a surface point at a first location within the real-world environment. Operation 1202 may be performed in any of the ways described herein.

In operation 1204, the lightmap management system may receive data from a light detection system located within the real-world environment. For example, the data received from the light detection system may be indicative of a second location within the real-world environment. The second location may be the location from which a real-world light source is to illuminate the object when the surface point is added to the real-world environment. Operation 1204 may be performed in any of the ways described herein.

In operation 1206, the lightmap management system may generate or update a dynamic lightmap for the object represented by the 3D model. In some examples, the generating or updating of the dynamic lightmap may be performed based on raytracing of virtual light rays from the second location to the first location. As such, the dynamic lightmap may be associated with a particular scene geometry in which the surface point is at the first location and is illuminated by the real-world light source from the second location. Operation 1206 may be performed in any of the ways described herein.

In operation 1208, the lightmap management system may provide the dynamic lightmap to a media player device communicatively coupled to the MEC server. For example, the lightmap management system may provide the dynamic lightmap in response to the generating or updating or the dynamic lightmap in operation 1206. The media player device to which the dynamic lightmap is provided may be located within the real-world environment and configured to present the extended reality representation of the real-world environment to a user of the media player device from a viewpoint of the media player device within the real-world environment. For instance, the media player device may present the extended reality representation of the real-world environment by performing operations including rendering an image that depicts the particular scene geometry from the viewpoint of the media player device within the real-world environment. In certain examples, such rendering may involve applying the dynamic lightmap to the 3D model. Operation 1208 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
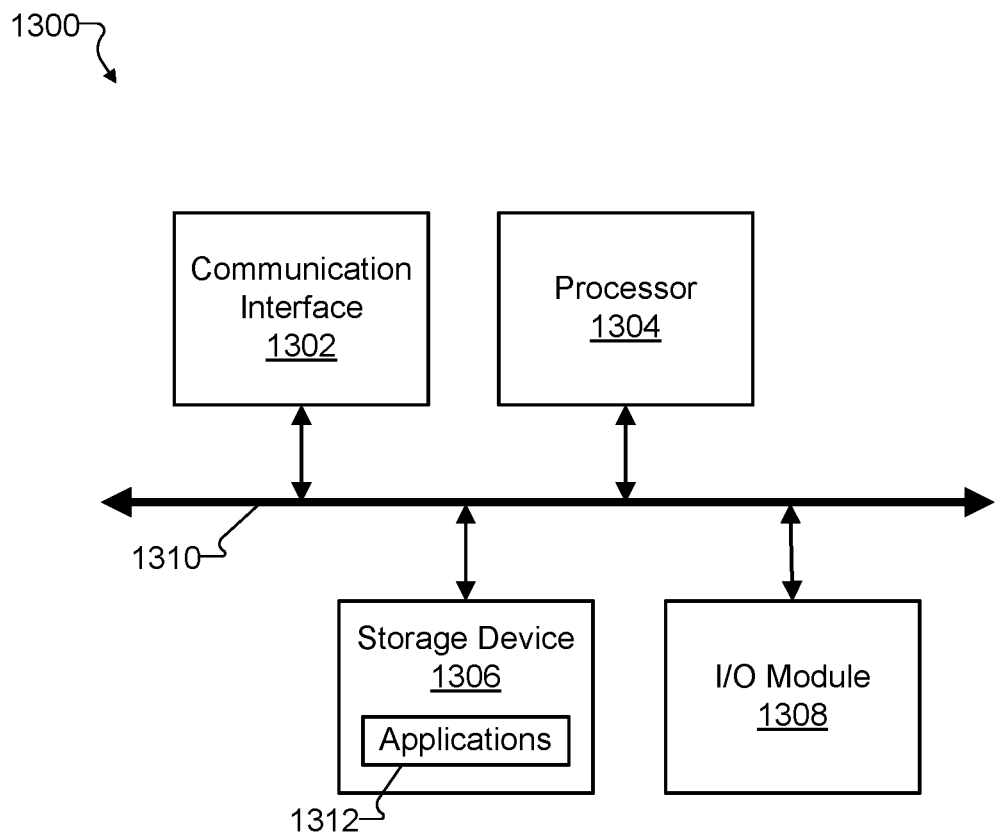
FIG. 13 illustrates an exemplary computing device according to principles described herein.

FIG. 13 illustrates an exemplary computing device 1300 that may be specifically configured to perform one or more of the processes described herein. For example, computing device 1300 may implement a lightmap management system such as system 100, a device such as media player device 206, or any other computing devices described herein.

As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with processing facility 104 of system 100. Likewise, storage facility 102 of system 100 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   identifying a viewpoint within a 3D scene, the viewpoint selected by a user of a media player device presenting the 3D scene to the user;
   receiving a dynamic lightmap for an object represented by a 3D model in the 3D scene, the dynamic lightmap generated or updated at a first level of detail determined based on the identified viewpoint; and
   rendering an image for presentation to the user from the identified viewpoint, the rendering of the image including:
      rendering the 3D model at a second level of detail that is lower than the first level of detail, and
      applying the dynamic lightmap generated or updated at the first level of detail to the 3D model rendered at the second level of detail.

2. The method of claim 1, wherein the first level of detail at which the dynamic lightmap is generated or updated is further determined based on a size of the object as presented within the 3D scene.

3. The method of claim 1, wherein the first level of detail at which the dynamic lightmap is generated or updated is determined based on the identified viewpoint by being determined based on a proximity, within the 3D scene, of a location of the object to a location associated with the identified viewpoint.

4. The method of claim 1, wherein:
   the dynamic lightmap is associated with a particular scene geometry for the 3D model of the object in the 3D scene;
   within the particular scene geometry, a surface point included on the 3D model is located at a first location within the 3D scene and is illuminated by a light source located at a second location within the 3D scene; and
   the dynamic lightmap is generated or updated based on raytracing of virtual light rays from the second location to the first location.

5. The method of claim 4, wherein the light source that illuminates the surface point within the 3D scene is a direct light source generating the virtual light rays that are traceable, via the raytracing, from the direct light source immediately to the surface point.

6. The method of claim 4, wherein the light source that illuminates the surface point within the 3D scene is an indirect light source reflecting the virtual light rays generated by a direct light source or reflecting from an additional indirect light source, the virtual light rays traceable, via the raytracing, from the indirect light source to the surface point.

7. The method of claim 1, wherein:
   when received, the dynamic lightmap for the object is included within a tiled lightmap frame together with an additional dynamic lightmap for an additional object represented by an additional 3D model in the 3D scene; and
   the method further comprises extracting the dynamic lightmap and the additional dynamic lightmap from the tiled lightmap frame prior to the rendering of the image for presentation to the user.

8. The method of claim 1, wherein the receiving of the dynamic lightmap includes:
   receiving an encoded video stream representative of a lightmap frame sequence that includes a sequence of lightmap frames each depicting the dynamic lightmap as generated or updated for a respective time during a time period throughout which the 3D scene is presented by the media player device; and
   decoding the encoded video stream to extract the lightmap frame sequence and the dynamic lightmap for each of the respective times during the time period.

9. The method of claim 8, further comprising:
   receiving, together with the sequence of lightmap frames for each of the respective times during the time period, metadata indicative of a respective timestamp for each of the respective times during the time period; and
   rendering, based on the metadata and the sequence of lightmap frames, a sequence of images for presentation to the user during the time period, the sequence of images including the image and the rendering of the sequence of images including the rendering of the image.

10. A system comprising:
    a memory storing instructions; and
    a processor communicatively coupled to the memory and configured to execute the instructions to:
       identify a viewpoint within a 3D scene, the viewpoint selected by a user of a media player device presenting the 3D scene to the user;
       receive a dynamic lightmap for an object represented by a 3D model in the 3D scene, the dynamic lightmap generated or updated at a first level of detail determined based on the identified viewpoint; and
       render an image for presentation to the user from the identified viewpoint, wherein the processor renders the image by performing operations including:
          rendering the 3D model at a second level of detail that is lower than the first level of detail, and
          applying the dynamic lightmap generated or updated at the first level of detail to the 3D model rendered at the second level of detail.

11. The system of claim 10, wherein the first level of detail at which the dynamic lightmap is generated or updated is further determined based on a size of the object as presented within the 3D scene.

12. The system of claim 10, wherein the first level of detail at which the dynamic lightmap is generated or updated is determined based on the identified viewpoint by being determined based on a proximity, within the 3D scene, of a location of the object to a location associated with the identified viewpoint.

13. The system of claim 10, wherein:
    the dynamic lightmap is associated with a particular scene geometry for the 3D model of the object in the 3D scene;
    within the particular scene geometry, a surface point included on the 3D model is located at a first location within the 3D scene and is illuminated by a light source located at a second location within the 3D scene; and the dynamic lightmap is generated or updated based on raytracing of virtual light rays from the second location to the first location.

14. The system of claim 13, wherein the light source that illuminates the surface point within the 3D scene is a direct light source generating the virtual light rays that are traceable, via the raytracing, from the direct light source immediately to the surface point.

15. The system of claim 13, wherein the light source that illuminates the surface point within the 3D scene is an indirect light source reflecting the virtual light rays generated by a direct light source or reflecting from an additional indirect light source, the virtual light rays traceable, via the raytracing, from the indirect light source to the surface point.

16. The system of claim 10, wherein:

when received, the dynamic lightmap for the object is included within a tiled lightmap frame together with an additional dynamic lightmap for an additional object represented by an additional 3D model in the 3D scene; and the processor is further configured to execute the instructions to extract the dynamic lightmap and the additional dynamic lightmap from the tiled lightmap frame prior to the rendering of the image for presentation to the user.

17. The system of claim 10, wherein the processor receives the dynamic lightmap by performing operations including:

receiving an encoded video stream representative of a lightmap frame sequence that includes a sequence of lightmap frames each depicting the dynamic lightmap as generated or updated for a respective time during a time period throughout which the 3D scene is presented by the media player device; and decoding the encoded video stream to extract the lightmap frame sequence and the dynamic lightmap for each of the respective times during the time period.

18. A non-transitory computer-readable medium storing instructions that, when executed, direct a processor of a computing device to:

identify a viewpoint within a 3D scene, the viewpoint selected by a user of a media player device presenting the 3D scene to the user;

receive a dynamic lightmap for an object represented by a 3D model in the 3D scene, the dynamic lightmap generated or updated at a first level of detail determined based on the identified viewpoint; and render an image for presentation to the user from the identified viewpoint, wherein the processor renders the image by performing operations including:

rendering the 3D model at a second level of detail that is lower than the first level of detail, and applying the dynamic lightmap generated or updated at the first level of detail to the 3D model rendered at the second level of detail.

19. The non-transitory computer-readable medium of claim 18, wherein the first level of detail at which the dynamic lightmap is generated or updated is further determined based on a size of the object as presented within the 3D scene.

20. The non-transitory computer-readable medium of claim 19, wherein the first level of detail at which the dynamic lightmap is generated or updated is determined based on the identified viewpoint by being determined based on a proximity, within the 3D scene, of a location of the object to a location associated with the identified viewpoint.

* * * * *